(12) United States Patent
Mineno et al.

(10) Patent No.: US 10,437,932 B2
(45) Date of Patent: Oct. 8, 2019

(54) DETERMINATION METHOD AND DETERMINATION APPARATUS

(71) Applicant: FUJITSU LIMITED, Kawasaki-shi, Kanagawa (JP)

(72) Inventors: Kazuo Mineno, Inagi (JP); Nobuko Takase, Mizuho (JP); Naohiro Itou, Numazu (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/925,337

(22) Filed: Mar. 19, 2018

(65) Prior Publication Data

US 2018/0285349 A1 Oct. 4, 2018

(30) Foreign Application Priority Data

Mar. 28, 2017 (JP) ................................. 2017-063680

(51) Int. Cl.
*G10L 15/08* (2006.01)
*G06F 17/27* (2006.01)
*G06N 20/00* (2019.01)

(52) U.S. Cl.
CPC ...... *G06F 17/2795* (2013.01); *G06F 17/2755* (2013.01); *G06F 17/2775* (2013.01); *G06F 17/2785* (2013.01); *G06N 20/00* (2019.01)

(58) Field of Classification Search
CPC ............. G06F 17/2785; G06F 17/2836; G06F 17/3069; G06F 17/2705; G06F 17/30663

USPC .................................................. 704/239, 251
See application file for complete search history.

(56) References Cited

U.S. PATENT DOCUMENTS

| | | | |
|---|---|---|---|
| 2003/0233224 A1* | 12/2003 | Marchisio | G06F 17/271 704/4 |
| 2012/0078919 A1 | 3/2012 | Mineno | |
| 2015/0227505 A1 | 8/2015 | Morimoto | |

FOREIGN PATENT DOCUMENTS

| | | |
|---|---|---|
| JP | 2010-102521 | 5/2010 |
| JP | 2012-073951 | 4/2012 |
| JP | 2015-028697 | 2/2015 |
| WO | 2013/118435 | 8/2013 |
| WO | 2014/033799 | 3/2014 |

* cited by examiner

*Primary Examiner* — George C Monikang
(74) *Attorney, Agent, or Firm* — Fujitsu Patent Center

(57) ABSTRACT

A determination method executed by a computer including a memory and a processor coupled to the memory, includes receiving a plurality of sentences and designation of terms included in the plurality of sentences, generating, for each term for which the designation is received, information indicating a relation between the term and each of other terms included in one of the plurality of sentences containing the term, extracting, for each term for which the designation is received, information indicating a specific relation from the generated information indicating the relation, generating characteristic information that uses the extracted information as a feature, and determining similarity between a plurality of the terms based on the generated characteristic information for each term.

13 Claims, 23 Drawing Sheets

| ARC SYMBOL | NAME | MEANING | EXAMPLE |
|---|---|---|---|
| <ASP> | MODALITY | INDICATE MODALITY EXPRESSION | -nebanaranai |
| <J.GA> | ga POSTPOSITIONAL PARTICLE | "ga" IS TAKEN | -<u>ga</u> |
| <J.NO> | no POSTPOSITIONAL PARTICLE | "no" IS TAKEN | -<u>no</u> |
| <METHOD> | METHOD | INDICATE METHOD OF ACTION | -<u>de</u> tsukuraretamono |
| <OBJ> | OBJECT | INDICATE OBJECT OF ACTION | hana <u>wo</u> ueru |
| <OBJA> | ADJECTIVE OBJECT | OBJECT TO BE MODIFIED BY ADJECTIVE | hana <u>wa</u> utsukushii |
| <PRED> | PREDICATE | INDICATE PREDICATE | watashi wa hon wo <u>yomu</u> |
| <SCOPE> | SCENE | INDICATE SCENE OF ACTION | choushoku <u>de</u>, -wo nomu |
| <ST> | START POINT | MAIN PREDICATE IN SENTENCE | watshi wa Tokyo ni <u>iku</u> |
| <TOUTEN> | COMMA | INDICATE COMMA | 、 |
| ... | | | |

FIG. 3

| ARC SYMBOL | NAME | MEANING | EXAMPLE |
|---|---|---|---|
| <ASP> | MODALITY | INDICATE MODALITY EXPRESSION | -nebanaranai |
| <J.GA> | ga POSTPOSITIONAL PARTICLE | "ga" IS TAKEN | -ga |
| <J.NO> | no POSTPOSITIONAL PARTICLE | "no" IS TAKEN | -no |
| <METHOD> | METHOD | INDICATE METHOD OF ACTION | -de tsukuraretamono |
| <OBJ> | OBJECT | INDICATE OBJECT OF ACTION | hana wo ueru |
| <OBJA> | ADJECTIVE OBJECT | OBJECT TO BE MODIFIED BY ADJECTIVE | hana wa utsukushii |
| <PRED> | PREDICATE | INDICATE PREDICATE | watashi wa hon wo yomu |
| <SCOPE> | SCENE | INDICATE SCENE OF ACTION | choushoku de, -wo nomu |
| <ST> | START POINT | MAIN PREDICATE IN SENTENCE | watshi wa Tokyo ni iku |
| <TOUTEN> | COMMA | INDICATE COMMA | 、 |
| ⋮ | | | |

FIG. 4

| INFORMATION i0 ON OBJECT NODE | | | | | | | INFORMATION i10 ON RELATED NODE | | | | | | |
|---|---|---|---|---|---|---|---|---|---|---|---|---|---|
| POS | | | TERM | | | DIRECTION | ARC 1 | | | | | | ARC N |
| | | | SEMANTIC ATTRIBUTE | | | CONCEPT SYMBOL | | POS | | SEMANTIC ATTRIBUTE | | CONCEPT SYMBOL | |
| POS (ADJ) | ... | POS (SN) | S1 | S2 | S3 | ... | | POS 1 | ... | POS 30 | ATTRI-BUTE 1 | ... | ATTRI-BUTE M | ... | ... |
| 0 | ... | 1 | 1 | 1 | 0 | ... | 0 | 0 | ... | 0 | 1 | ... | 0 | ... | ... |

FIG. 6B

TERM 1 "kasutamaizu"

[Diagram: NEED →(OBJA)→ ○ (J.GA); NEED →(OBJA)→ CUSTOMIZE →(OBJ)→ EJR01]

[POS] SN
[CONCEPT SYMBOL] CUSTOMIZE
[SEMANTIC ATTRIBUTE] S1, S2, ...

⇒ GENERATE CHARACTERISTIC VECTOR ⇒

CHARACTERISTIC VECTOR OF TERM 1

| TERM 1 | | | | | | | | | ARC (OBJA) | | | | | | | |
|---|---|---|---|---|---|---|---|---|---|---|---|---|---|---|---|---|
| POS | | SEMANTIC ATTRIBUTE | | | | CONCEPT SYMBOL | | | DIRECTION | POS | | | SEMANTIC ATTRIBUTE | | | CONCEPT SYMBOL |
| POS (ADJ) | POS (SN) | ... | S1 | S2 | S3 | ... | CUSTOMIZE | ... | | POS 1 | ... | POS 30 | ATTRIBUTE 1 | ... | ATTRIBUTE M | ... | NEED | ... | ARC N |
| 0 | 1 | ... | 1 | 1 | 0 | ... | 1 | ... | 1 | 0 | ... | 0 | 1 | ... | 0 | ... | 1 | ... | ... |

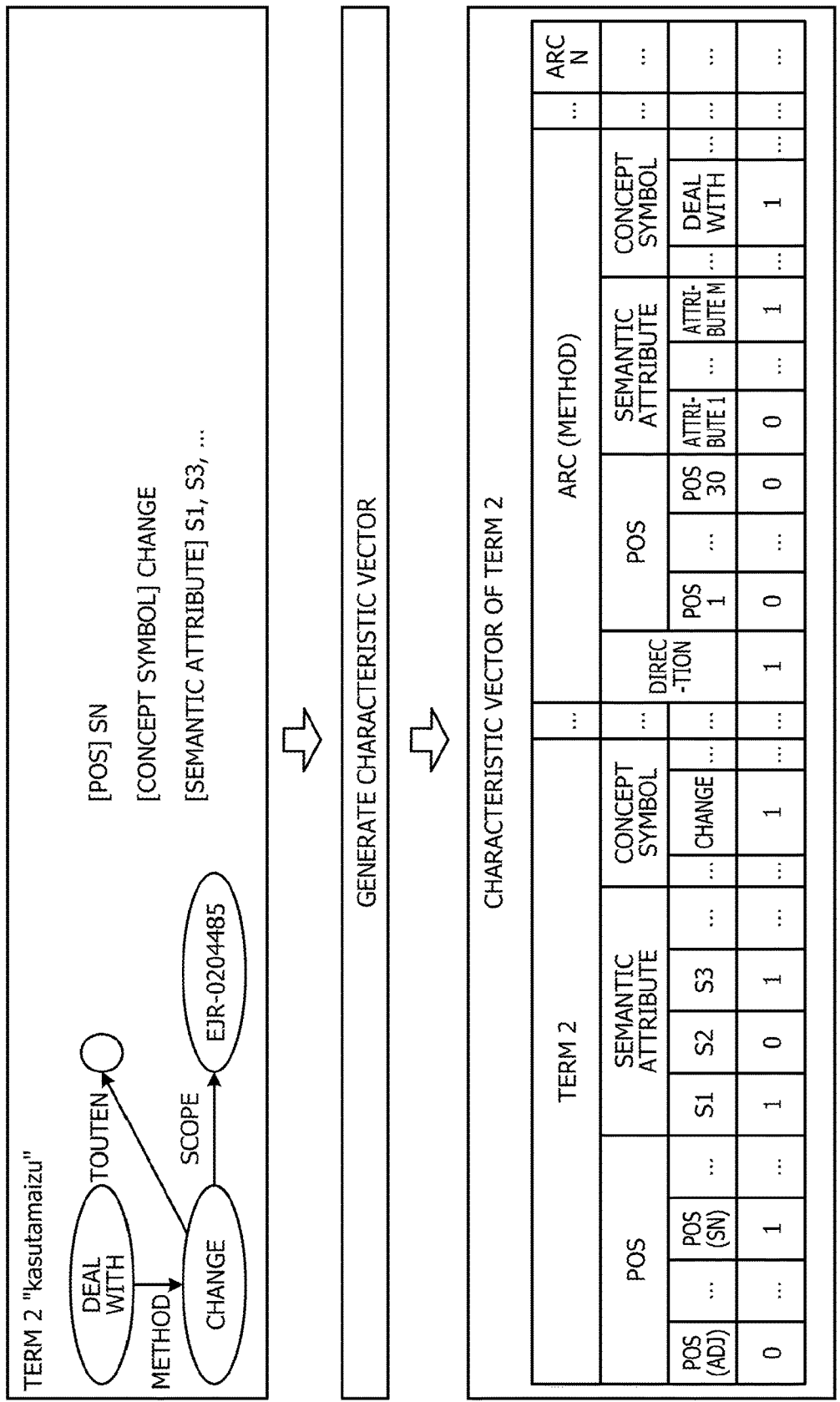

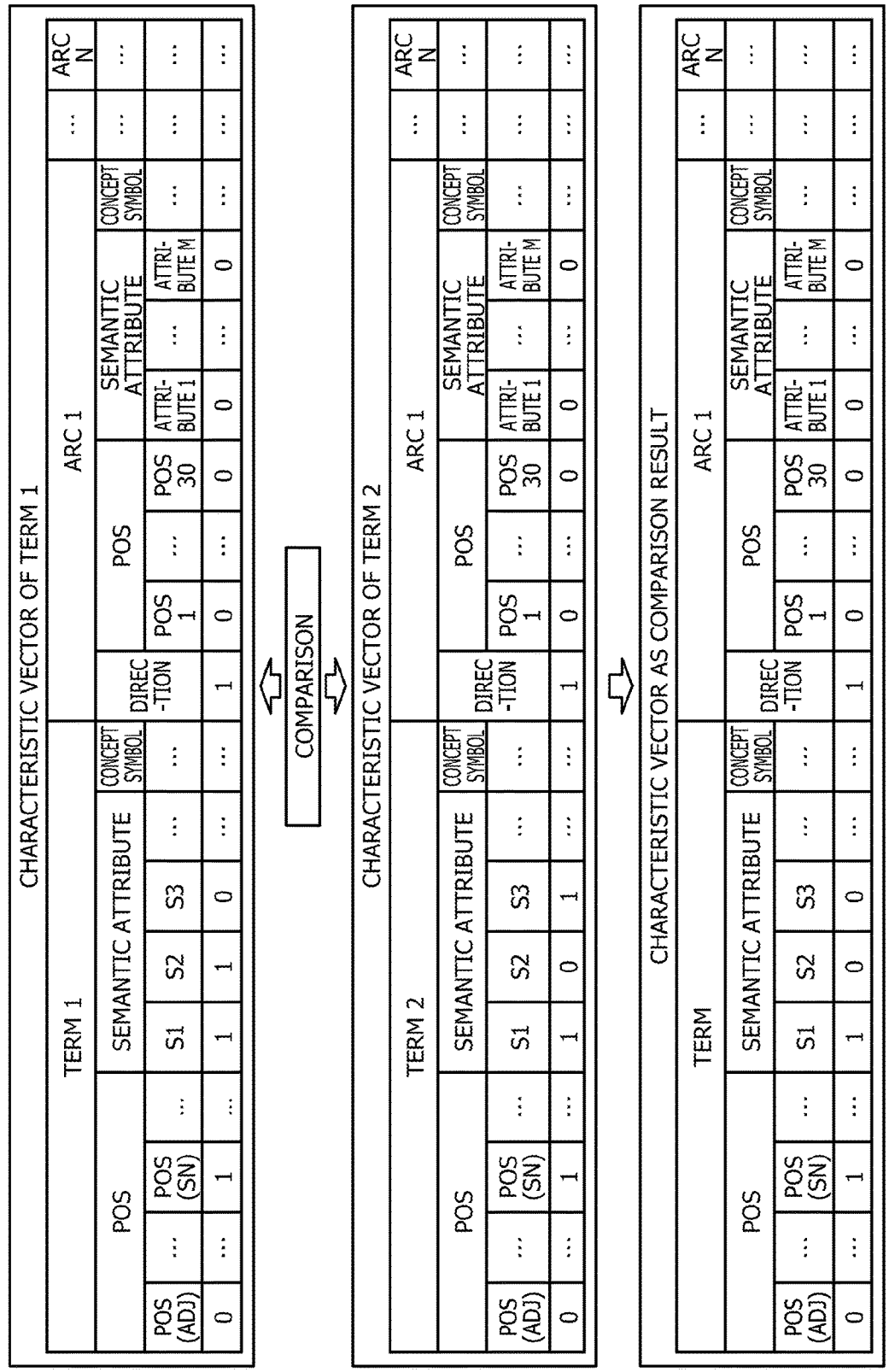

FIG. 8

CHARACTERISTIC VECTORS GENERATED FROM PAIRS OF TERMS 1 AND 2 (x101), (x102), (x103)

| | TERM 1 | | | | | | | | | | | | |
|---|---|---|---|---|---|---|---|---|---|---|---|---|---|
| | POS | | SEMANTIC ATTRIBUTE | | | CONCEPT SYMBOL | DIREC-TION | ARC 1 | | | | | ARC N |
| | POS 1 (ADJ) | ... | POS M (SN) | S1 | S2 | S3 | ... | | | POS 1 | ... | POS N | SEMANTIC ATTRIBUTE | ... | |
| | | | | | | | | | | | | | NN | ... | |
| | 0.01 | ... | 0.002 | 0.023 | 0.023 | 0.023 | ... | | 0.006 | 0.001 | ... | 0.0011 | 0.012 | ... | ... |

| TERM 2 | | | | | | | | | | | | | |
|---|---|---|---|---|---|---|---|---|---|---|---|---|---|
| POS | | SEMANTIC ATTRIBUTE | | | | CONCEPT SYMBOL | DIREC-TION | ARC 1 | | | | | ARC N |
| POS 1 (ADJ) | ... | POS M (SN) | S1 | S2 | S3 | ... | | | POS 1 | ... | POS N | SEMANTIC ATTRIBUTE NN | ... | |
| 0.0005 | ... | 0.0003 | 0.0041 | 0.0053 | 0.0053 | ... | | 0.003 | 0.0022 | ... | 0.0012 | 0.0011 | ... | ... |

| MATCHING | | | | | | | | | | | | | |
|---|---|---|---|---|---|---|---|---|---|---|---|---|---|
| POS | | SEMANTIC ATTRIBUTE | | | | CONCEPT SYMBOL | DIREC-TION | ARC 1 | | | | | ARC N |
| POS 1 (ADJ) | ... | POS M (SN) | S1 | S2 | S3 | ... | | | POS 1 | ... | POS N | SEMANTIC ATTRIBUTE NN | ... | |
| 0.0000 | ... | 0.0022 | 0.0123 | 0.0034 | 0.0034 | ... | | 0.002 | 0.0032 | ... | 0.0023 | 0.0056 | ... | ... |

× WEIGHT VECTOR (MACHINE LEARNING RESULT)

OVERALL EVALUATION VALUE
$y_{101} = 0.8654$
$y_{102} = -2.0937$
$y_{103} = 1.5789$

THRESHOLD DETERMINATION:
THRESHOLD=1, (WHERE MARGIN = 1)

IS SYNONYM? (DETERMINATION IS IMPOSSIBLE)
$y_{101}$=Gray:POSSIBLY NOT SYNONYM
$y_{102}$=Black:NOT SYNONYM
$y_{103}$=White:SYNONYM

FIG. 16

| No. | SYMBOL | NAME | SELECTION | EXPLANATION |
|---|---|---|---|---|
| 1 | ADJ | ADJECTIVE | ○ | ex) utuskishi, kanashi |
| 2 | ADV | ADVERB | × | ex) suguni, totemo, kesshite |
| 3 | ADVN | ADVERBIAL NOUN | ○ | ex) kekka |
| 4 | AN | ADJECTIVE VERB | ○ | ex) orokanari, doudoutari |
| 5 | CONJ | CONJUNCTION, CONNECTION POSTPOSITIONAL PARTICLE | × | ex) oyobi, mataha |
| 6 | DET | ADNOMINAL | × | ex) kono, sono, tsugi |
| 7 | INTJ | INTERJECTION | × | ex) minasan, ohayou, hajimemashite |
| 8 | N | NOUN | ○ | ex) ki, hon |
| 9 | NADV | ADVERBIAL NOUN | × | ex) chotto, takusan |
| 10 | PREF | PREFIX | × | ex) sai, go, zen |
| 11 | PREP | PREPOSITION | × | ex) in, to (NOT EXIST IN JAPANESE LANGUAGE) |
| 12 | PROPN | PROPER NOUN | ○ | ex) fujitsu |
| 13 | PROV | PROVERB | × | ex) kanyougo |
| 14 | SN | NOUN WITH sa IRREGULAR CONJUGATION | ○ | ex) gaitou-suru, enjoy-suru |
| 15 | V, V1, V5 | VERB | ○ | ex) kaku, ugoku |
| 16 | CW | SYMBOL | × | ex) . |

TRAINING DATA (2306 EXAMPLES GENERATED)

| POSITIVE INSTANCE/ NEGATIVE INSTANCE | SYNONYM CANDIDATES | ROW NUMBER | ORIGINAL SENTENCE |
|---|---|---|---|
| POSITIVE EXAMPLE (SYNONYM) | Kuria | 40438 | Hitsuyou ni oujite, komanndo wo shiyoushite memoriijouno jouhou wo kuria shitekudasai. |
| | Shoukyo | 1235442 | Kanshi taishou fairu no naiyou wo shoukyosuru. |
| NEGATIVE EXAMPLE (NOT SYNONYM) | Kuria | 40438 | Hitsuyou ni oujite, komanndo wo shiyoushite memoriijouno jouhou wo kuria shitekudasai. |
| | Kuria | 2492544 | Kaizoudo wo agerukotode, gazou ga kuria ninarimasu |
| POSITIVE EXAMPLE (SYNONYM) | Kuria | 2492544 | Kaizoudo wo agerukotode, gazou ga kuria ninarimasu |
| | Meikaku | 7511675 | Atai wo ookikusuruto, kyoukaisen ni sotta ejji ga ookikunarimasu. |
| ⋮ | ⋮ | ⋮ | ⋮ |

ANALYZED DATA

| | TOTAL | POSITIVE EXAMPLE | NEGATIVE EXAMPLE | RATE OF POSITIVE EXAMPLE |
|---|---|---|---|---|
| DATA GROUP x (TRAINING DATA) | 769 | 255 | 514 | 0.33 |
| DATA GROUP y (FOR ADJUSTING TRAINING DATA) | 769 | 255 | 514 | 0.33 |
| DATA GROUP z (FOR EVALUATION) | 768 | 252 | 516 | 0.37 |
| TOTAL | 2306 | 762 | 1544 | |

⇩

DETERMINATION RESULT

| | | DETERMINATION BY PERSON | |
|---|---|---|---|
| | | SYNONYM | NOT SYNONYM |
| DETERMINATION BY MACHINE | SYNONYM | 175 | 253 (EXCESSIVE EXTRACTION) |
| | NOT SYNONYM | 80 (OVERLOOK) | 261 |

SYNONYM EXTRACTION RATE 69%

DETERMINATION METHOD AND DETERMINATION APPARATUS

CROSS-REFERENCE TO RELATED APPLICATION

This application is based upon and claims the benefit of priority of the prior Japanese Patent Application No. 2017-63680, filed on Mar. 28, 2017, the entire contents of which are incorporated herein by reference.

FIELD

The embodiments discussed herein are related to a determination method and a determination apparatus.

BACKGROUND

In documents such as manuals, papers, and design documents, which are desired to satisfy logical integrity, the same expression may be used to represent the same meaning and another expression may be used to represent another meaning. Accordingly, the work of revising a document involves determining whether different expressions are used to represent the same meaning and whether the same expression is used to represent different meanings. Different expressions representing the same meaning are called "synonyms". One and the same expression representing different meanings is called a "polyseme".

A procedure to determine whether an expression is a synonym or polyseme is as follows:

1) A sentence is divided into words by morpheme analysis processing;

2) The divided words are collated with dedicated dictionaries such as the synonyms/polysemes dictionary to specify a determination target; and 3) A person checks and determines that the determination target in one of the plurality of sentences is a synonym or polyseme.

Moreover, a technique of determining whether a predicate pair or an "argument-predicate pair" is synonymous, antonymous, or irrelevant is disclosed (for example, see Japanese Laid-open Patent Publication No. 2015-28697). In this technique, a determination apparatus extracts at least one of a dictionary definition sentence feature and a sematic attribute feature of each predicate pair which is stored in a learning corpus storage unit and is classified into any of synonymous, antonymous, and irrelevant in advance. Further, the determination apparatus extracts a feature representing a pair of substrings and a feature representing the likelihood of parallel predicates of the substrings, constructs a feature for classifying the substrings to synonyms or antonyms, and learns a classification model for classifying the substrings to synonyms or antonyms.

Other related techniques are disclosed in, for example, Japanese Laid-open Patent Publication Nos. 2010-102521 and 2012-73951.

SUMMARY

According to an aspect of the invention, a determination method executed by a computer including a memory and a processor coupled to the memory, includes receiving a plurality of sentences and designation of terms included in the plurality of sentences, generating, for each term for which the designation is received, information indicating a relation between the term and each of other terms included in one of the plurality of sentences containing the term, extracting, for each term for which the designation is received, information indicating a specific relation from the generated information indicating the relation, generating characteristic information that uses the extracted information as a feature, and determining similarity between a plurality of the terms based on the generated characteristic information for each term.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating one example of arc symbols;

FIG. 4 is a diagram illustrating one example of the configuration of a characteristic vector according to the first embodiment;

FIG. 6B is a diagram (2) illustrating one example of the characteristic vector generation processing according to the first embodiment;

FIG. 6C is a diagram (3) illustrating one example of the characteristic vector generation processing according to the first embodiment;

FIG. 6D is a diagram (4) illustrating one example of the characteristic vector generation processing according to the first embodiment;

FIG. 8 is a diagram illustrating one example of synonym determination processing according to the first embodiment;

FIG. 16 is a diagram illustrating one example of dimension compression related to the part of speech of a target term;

FIG. 18 is a diagram illustrating one example of the characteristic vector as a dimension compression result according to the second embodiment;

FIG. 19 is a diagram illustrating one example of a determination result by synonym determination processing according to the second embodiment.

DESCRIPTION OF EMBODIMENTS

There has been a problem in the related art that it is difficult to improve the extraction accuracy of synonyms or polysemes.

For example, in the procedure to determine an expression, a person checks and determines that the determination target is a synonym or polyseme. To begin with, the determination as for a synonym or polyseme by considering the meaning is desirable even for the same term, because it is preferable to make different determinations for the same term depending on the usage of the term. However, the determination by considering the meaning is difficult in the machine processing, and the intervention of a person is thus desirable. However, the intervention of persons may cause variations among the persons, omissions, and errors. Accordingly, it is difficult to improve the extraction accuracy of synonyms or polysemes with such a procedure.

Moreover, in the related art, the determination apparatus learns a classification model for classifying an argument-predicate pair into synonyms and antonyms, and determines whether the argument-predicate pair is synonymous or antonymous, but does not determine whether the argument pair is synonymous or antonymous. Moreover, the determination apparatus does not determine whether the predicate pair is synonymous or antonymous. Accordingly, the determination apparatus is unable to improve the extraction accuracy of synonyms. Moreover, in the related art, a polyseme is not extracted.

Embodiments discussed herein related to a determination method and a determination apparatus are described in details in accordance with the drawings. Noted that the determination apparatus is described as an information processing apparatus in the embodiments. The embodiments do not intend to limit the present disclosure.

[First Embodiment]

[Configuration of Computer According to First Embodiment]

Figure 1:
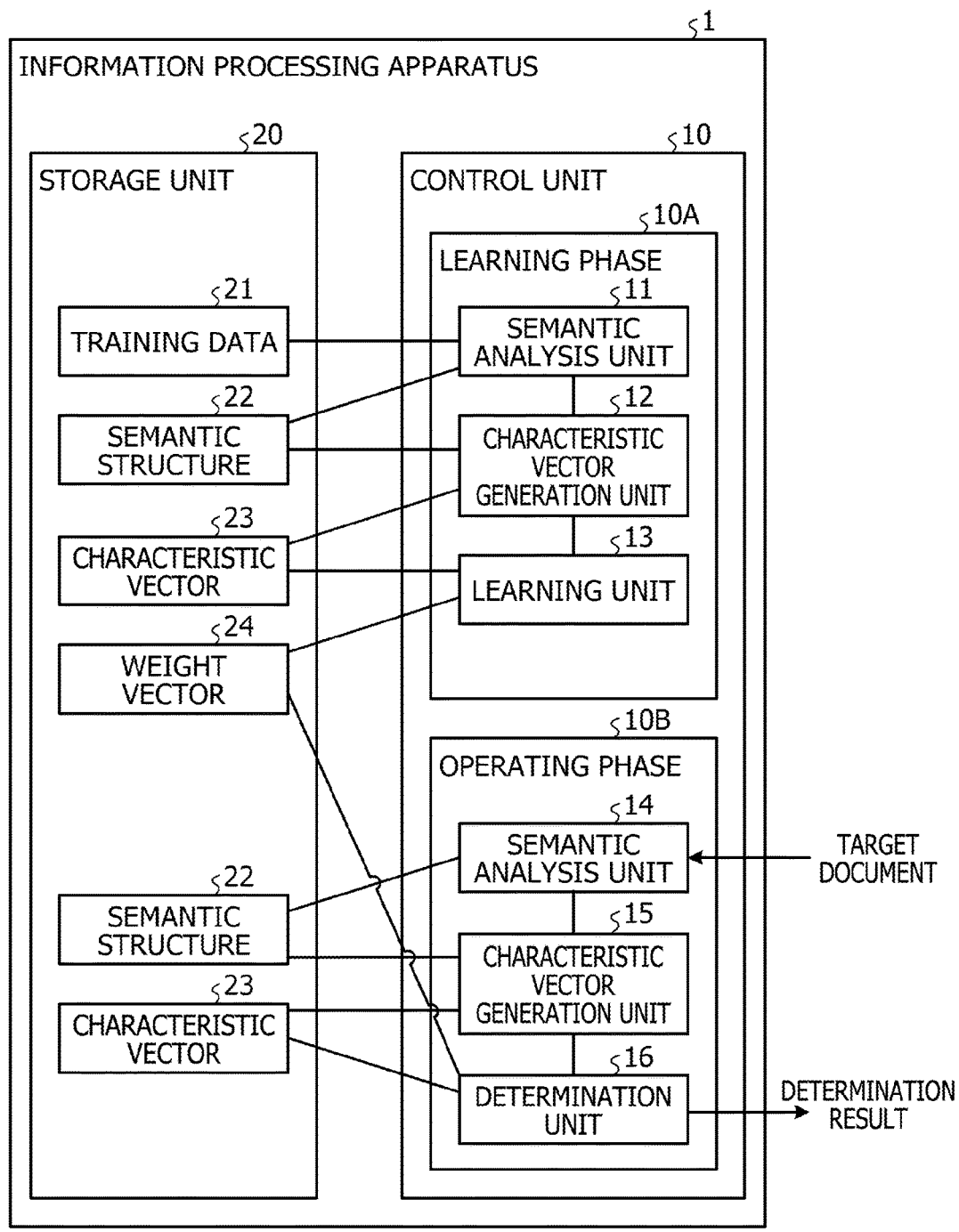
FIG. 1 is a function block diagram illustrating one example of the configuration an information processing apparatus according to a first embodiment.

FIG. 1 is a function block diagram illustrating one example of the configuration an information processing apparatus according to the first embodiment. An information processing apparatus 1 illustrated in FIG. 1 automatically performs a determination on the similarity between a plurality of expressions, using a result of semantic analysis processing (called "semantic structure") of natural language utilized in the machine translation and the like. The similarity between the expressions includes a synonymous relation between the expressions or a polysemous relation between the expressions. The different expressions representing the same meaning are called "synonyms". One and the same expression representing different meanings is called a "polyseme".

Noted that "sentence" used in the first embodiment is the minimum unit of a sentence having a meaning, and does not have to contain a subject or a predicate in some cases. The "sentence" is generally separated by a full stop in Japanese language, and is separated by a period in English language. The "sentence" is "a unit of text". A "document" indicates text including a plurality of sentences. Moreover, the "semantic structure" used in the first embodiment indicates a graph structure represented by a node indicating a concept (meaning) that is generated as a result of the semantic analysis processing of a sentence and indicates the meaning of the sentence, and an directed arc indicating the relation of the concept. Moreover, the "semantic attribute" used in the first embodiment indicates a symbol (attribute) indicating the grammatical and semantic property of a node in the "semantic structure". Moreover, the "term" used in the first embodiment indicates a word or phrase having a meaning independently. The phrase indicates a unit of two or more words.

The information processing apparatus 1 includes a control unit 10 and a storage unit 20.

The control unit 10 corresponds to an electronic circuit such as a central processing unit (CPU). Further, the control unit 10 includes an internal memory for storing therein programs that define various kinds of processing procedures or control data, and executes various processing with these programs and data. The control unit 10 includes a learning phase 10A and an operating phase 10B. The learning phase 10A includes a semantic analysis unit 11, a characteristic vector generation unit 12, and a learning unit 13. Further, the semantic analysis unit 11 is one example of a reception unit and a first generation unit. The characteristic vector generation unit 12 is one example of a second generation unit. The learning unit 13 is one example of a determination unit.

The storage unit 20 is, for example, a semiconductor memory element such as a RAM, a flash memory, or a storage device such as a hard disk or an optical disk. The storage unit 20 includes a training data 21, a semantic structure 22, a characteristic vector 23, and a weight vector 24. Further, the semantic structure 22 is one example of information indicating the relation. The characteristic vector 23 is one example of characteristic information.

The training data 21 is data in which a pair of information each including a sentence serving as an example question together with a determination target term is designated, and includes a positive example indicating a correct example question and a negative example indicating an incorrect example question. The training data 21 of the positive example is a pair of information each including a determination target term as being a synonym together with a sentence containing the term. The training data 21 of the negative example is a pair of information each including a determination target term as being not a synonym together with a sentence containing the term. For example, the term "kasutamaizu" in a sentence "Unyoukankyou no kasutamaizu ga hitsuyou desu." and the term "henkou" in a sentence "Unyoukankyou no henkou niyori, taisho ga hitsuyou desu." are different expressions representing the same meaning, and thus are synonyms. Therefore, the pair of the term "kasutamaizu" to be determined together with the sentence "Unyoukankyou no kasutamaizu ga hitsuyou desu." and the term "henkou" to be determined together with the sentence "Unyoukankyou no henkou niyori, taisho ga hitsuyou desu." is one example of the training data 21 of the positive instance. In contrast, the term "kasutamaizu" in the sentence "Unyoukankyou no kasutamaizu ga hitsuyou desu." and the term "henkou" in a sentence "Soshiki henkou niyoru taisho ga hitsuyou dearu." are not different expressions representing the same meaning, and thus are not synonyms. Therefore, the pair of the term "kasutamaizu" to be determined together with the sentence "Unyoukankyou no kasutamaizu ga hitsuyou desu." and the term "henkou" to be determined together with the sentence "Soshiki henkou niyoru taisho ga hitsuyou dearu." is one example of the training data 21 of the negative example.

The semantic analysis unit 11 selects one pair of the training data 21 from the inputted training data 21. The semantic analysis unit 11 performs a morpheme analysis and a semantic analysis on two example sentences contained in the selected training data 21, and generates the semantic structures 22. More specifically, the semantic analysis unit 11 generates the semantic structure 22 for each of the example sentences by the semantic analysis processing of a natural language. Noted that the semantic analysis processing performed by the semantic analysis unit 11 may be implemented using the existing machine translation techniques. For example, this semantic analysis processing may be performed using the machine translation techniques disclosed in, for example, Japanese Laid-open Patent Publication Nos. 6-68160, 63-136260, and 4-372061. Moreover, the semantic structure 22 is disclosed in, for example, Japanese Laid-open Patent Publication No. 2012-73951.

Figure 2A:
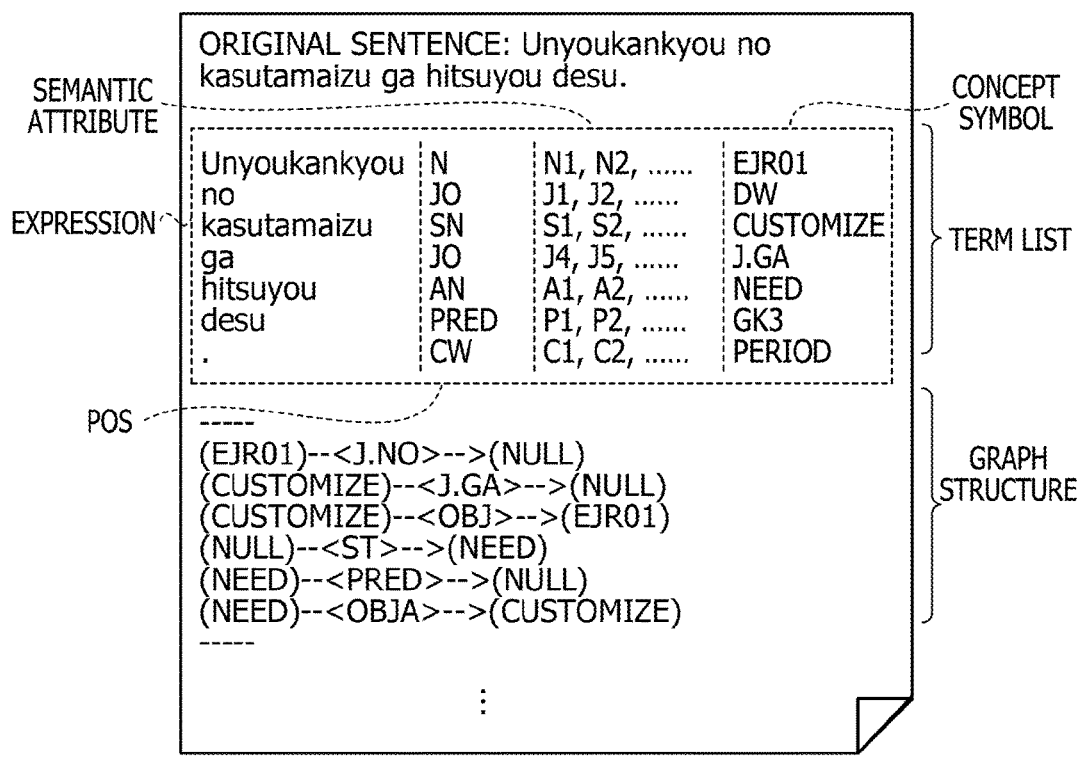
FIG. 2A is a diagram (1) illustrating one example of a semantic structure.
Figure 2B:
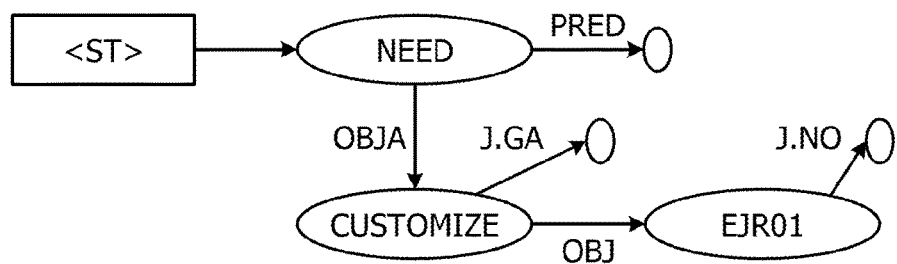
FIG. 2B is a diagram (2) illustrating one example of a semantic structure.

Herein, one example of the semantic structure 22 is described with reference to FIG. 2A and FIG. 2B. FIG. 2A and FIG. 2B are diagrams illustrating one example a semantic structure. FIG. 2A is a diagram illustrating the internal representation of the semantic structure 22, and FIG. 2B illustrates the semantic structure 22 schematically. Further, the semantic structure 22 illustrated in FIG. 2A and FIG. 2B is a result of the semantic analysis processing to the original sentence "Unyoukankyou no kasutamaizu ga hitsuyou desu.".

As illustrated in FIG. 2A, the internal representation of the semantic structure 22 includes a term list and a graph structure.

In the term list, a list of terms is represented. One term is represented by "expression", "part of speech", "semantic attribute", and "concept symbol". The "semantic attribute" is a symbol (attribute) indicating the grammatical and semantic property of an associated term, and includes, for example, a thesaurus attribute, a countability rule, and a conjugation rule. The thesaurus attribute indicates an attribute in which a semantic hierarchical relationship of the term is described. The "concept symbol" indicates a symbol that identifies the concept indicated by the term in a semantic viewpoint (concept level). As one example of the term, when the expression is "kasutamaizu", described are noun with sa irregular conjugation "SN" as the part of speech, "S1, S2, . . . " as the semantic attribute, and "CUSTOMIZE" as the concept symbol. Noted that the "expression", the "part of speech", the "semantic attribute", and the "concept symbol" are examples of attribute information included in the term.

The graph structure is represented by (From node)-<arc>→(To node), and indicates that the concept of the (From node) is connected toward the concept of the (To node) with the <arc>. Each node is assigned with a concept symbol representing a concept for the corresponding term. As one example, as for (CUSTOMIZE)-<OBJ>→(EJR01), the concept of From node corresponds to the term "kasutamaizu" of the concept symbol (CUSTOMIZE), the concept of the To node corresponds to the term "unyoukankyou" of the concept symbol (EJR01), and the concept (CUSTOMIZE) and the concept (EJR01) has an object relation <OBJ>. In other words, the (CUSTOMIZE)-<OBJ>→(EJR01) indicates that <object> of "kasutamaizu" is "unyoukankyou". Each node has the "expression", the "part of speech", the "semantic attribute", and the "concept symbol, which are indicated in the term list. Further, the arc is one example of relation information between a node and a node.

As illustrated in FIG. 2B, for example, the concept having a meaning of "kasutamaizu" is represented by a concept symbol of "CUSTOMIZE". Further, a node of the concept symbol of "CUSTOMIZE" is connected to the concept having a meaning of "unyoukankyou" that is represented by the concept symbol of "EJR01" with an arc a symbol of "OBJ". In addition, an arc "J.GA" in which the other node does not exist is connected to the node of the concept symbol of "CUSTOMIZE". This arc indicates that the concept "CUSTOMIZE" that is From node has a meaning of "J.GA", in other words, "kasutamaizu" takes the postpositional particle of "ga" having a meaning of limitation. Moreover, the node of the concept symbol of "CUSTOMIZE" is connected to a concept for "hitsuyou" and represented by a concept symbol of "NEED" with an arc having the symbol of "OBJA". Moreover, an arc <ST> in which From node does not exist indicates that the concept "NEED" that is To node is the central concept of this sentence. In other words, the semantic structure 22 is expressed by a concept, and a directed graph that represents the semantic relation of the concept or between the concepts. Hereinafter, when "term" in the expression is not desired to be especially distinguished from "concept" in the semantic structure, a node of the concept for a specific term is simply referred to as term.

Herein, one example of symbols of arc is described with reference to FIG. 3. FIG. 3 is a diagram illustrating one example arc symbols.

As illustrated in FIG. 3, a symbol of the arc "<OBJ>" indicates "object" as a name, and indicates "indicating object of action" as a meaning. A symbol of the arc "<OBJA>" indicates "adjective object" as a name, and indicates "object to be modified by adjective" as a meaning. A symbol of the arc "<J.GA>" indicates "ga postpositional particle" as a name, and indicates ""ga" is taken" as a meaning. Noted that the symbols of the arcs illustrated in FIG. 3 are merely examples, and are not limited to these.

Referring back to FIG. 1, the characteristic vector 23 is characteristic information that uses information on the specific semantic structure 22 in the determination target term in the semantic structure 22, as a feature. For example, the characteristic vector 23 is characteristic information that uses information (the part of speech, the semantic attribute, and the concept symbol) indicating a determination target term, and information (the part of speech, the semantic attribute, and the concept symbol) indicating a term that is directly connected to the determination target term with an arc. The feature herein represents information (elements that decompose the phenomenon) used for identification, and indicates information that serves an axis of the characteristic vector 23. Details of the characteristic vector 23 are described later.

The characteristic vector generation unit 12 compares the pair of the semantic structures 22 generated regarding one pair of the training data 21 to generate the characteristic vector 23 to be used in the machine learning.

For example, regarding one of the semantic structures 22 out of the pair of the semantic structures 22, the characteristic vector generation unit 12 isolates a node (called object node) for the determination target term and its surroundings as a range for which the characteristic vector 23 is generated. Regarding the other semantic structure 22 out of the pair of the semantic structures 22. The characteristic vector generation unit 12 isolates a node for the determination target term and its surroundings as a range for which the characteristic vector 23 is generated. As one example of the surrounding isolation, the characteristic vector generation unit 12 causes only the object node and nodes (related nodes) directly connected to the object node with arcs to remain, and deletes the other nodes from the object semantic structure.

Further, the characteristic vector generation unit 12 generates the characteristic vectors 23 respectively from the two semantic structures 22 each indicating a result of the surrounding isolation. These two characteristic vectors 23 generated have all the same features with the same order, and are compared with each other to accordingly generate a new characteristic vector 23 in which a value of the matched features is set to 1, and a value of the unmatched features is set to 0. In addition, the characteristic vector generation unit 12 generates a characteristic vector 23 in which the three characteristic vectors described above are synthesized.

Herein, one example of the configuration of the characteristic vector 23 generated from the semantic structure 22 is described with reference to FIG. 4. FIG. 4 is a diagram illustrating one example of the configuration of a characteristic vector according to the first embodiment. Further, the characteristic vector 23 illustrated in FIG. 4 is one example of characteristic information that uses information i0 on an object node for a determination target term, and information i10 on a relation node for a term that is directly connected to the determination target term with an arc, as features. As illustrated in FIG. 4, for the object node of the determination target term, the characteristic vector 23 includes various kinds of features of the part of speech, various kinds of features of the semantic attribute, and various kinds of features of the concept symbol. There are 30 features of the part of speech, for example. There are 10000 features of the semantic attribute, for example. Further, among the features of the part of speech, a feature matched with the feature in the determination target term is set to have a value of 1. Among the features of the semantic attribute, a feature matched with the feature in the determination target term is set to have a value of 1. Among the features of the concept symbol, a feature matched with the feature in the determination target term is set to have a value of 1. In addition, for a related node of a term that is directly connected to the determination target term with an arc, the characteristic vector 23 includes the following features for each of arcs, the features including the feature of the direction, and various kinds of features of the part of speech, various kinds of features of the semantic attribute, and various kinds of features of the concept symbol, which are included in the related node that is connected to the arc. There are 700 arcs, for example. There is 1 feature for the direction. Moreover, since the information included in the related node is the same as in the object node, therefore, there are 30 features of the part of speech, for example. There are 10000 features of the semantic attribute, for example. Further, information on the related node to which the object node is directly connected with the arc is set in a region for the arc. Regarding the related node, among the features of the part of speech, a feature matched with the feature in the determination target term is set to have a value of 1. Regarding the related node, among the features of various kinds of semantic attributes, a feature matched with the feature in the determination target term is set to have a value of 1. Regarding the related node, among the features of the concept symbol, a feature matched with the feature in the determination target term is set to have a value of 1.

Noted that in the characteristic vector 23 illustrated in FIG. 4, the head feature of the part of speech is set as ADJ, the order of features of the semantic attribute is set as S1, S2, and S3, however, the embodiments are not limited to these but may employ the order set in advance.

Referring back to FIG. 1, the characteristic vector generation unit 12 compares the generated the two characteristic vectors 23 with each other, and generates a characteristic vector 23 as a comparison result. As one example, regarding the generated the two characteristic vectors 23, the characteristic vector generation unit 12 successively compares values of the features from the head feature to generate the characteristic vector 23 as a comparison result in which the value of the matched feature is set to 1 and the value of the unmatched feature is set to 0.

Further, the characteristic vector generation unit 12 connects the three the generated characteristic vectors 23, in other words, the two characteristic vectors 23 respectively generated from the two semantic structures 22 and the characteristic vector 23 as a comparison result to generate the characteristic vector 23 for machine learning or as a determination target.

The learning unit 13 inputs the characteristic vectors 23 for machine learning respectively generated from all the training data 21 into a machine learning device that performs supervised learning, and performs learning. The machine learning device herein includes, for example, a support vector machine (SVM). A case where the SVM is employed as a machine learning device is hereinafter described. The learning unit 13 derives one weight vector 24 as a learning result from characteristic vectors for machine learning respectively corresponding to the training data. The weight vector 24 herein is a vector that includes the structure the same as that of the inputted characteristic vectors 23 for machine learning, and has an evaluation weight as a value relative to each feature in the structure. Noted that "a characteristic vector for machine learning corresponding to the training data" is simply referred to "characteristic vector for machine learning" hereinafter.

Figure 5:
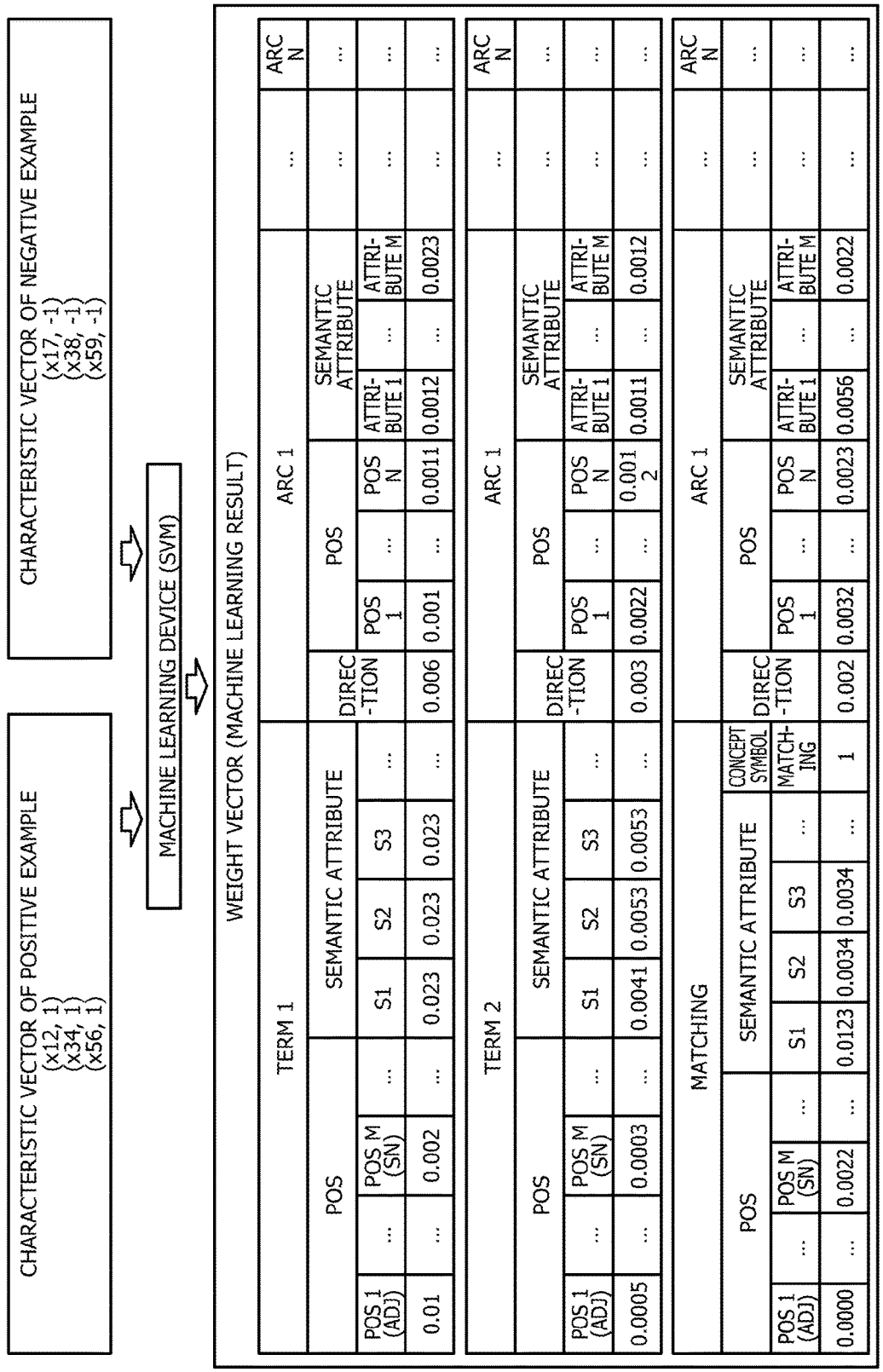
FIG. 5 is a diagram illustrating one example of a weight vector that is derived by a learning phase according to the first embodiment.

Herein, one example of the weight vector 24 is described with reference to FIG. 5. FIG. 5 is a diagram illustrating one example of a weight vector that is derived by a learning phase according to the first embodiment. As illustrated in FIG. 5, the characteristic vector 23 for machine learning generated from the training data 21 of the positive example and the characteristic vector 23 for machine learning generated from the training data 21 of the negative example are inputted into the machine learning device (SVM). Herein, as the training data 21 of the positive instance, $(x_{12}, 1)$, $(x_{34}, 1)$, and $(x_{56}, 1)$ are inputted, and as the training data 21 of the negative example, $(x_{17}, -1)$, $(x_{38}, -1)$, and $(x_{59}, -1)$ are inputted. For example, $x_{12}$ of $(x_{12}, 1)$ indicates that the characteristic vector 23 generated from a combination of an example question sentence 1 and an example question sentence 2, and 1 of $(x_{12}, 1)$ indicates the positive example, and $x_{17}$ of $(x17, -1)$ indicates that the characteristic vector 23 generated from a combination of an example question sentence 1 and an example question sentence 7, and −1 of $(x_{17}, -1)$ indicates the negative example.

Under such a status, the learning unit 13 derives one weight vector 24 as a learning result from the characteristic vectors 23 that are the inputted training data (positive example and negative example). The weight vector 24 has a structure the same as that of the inputted characteristic vectors 23. Further, the weight vector 24 includes an evaluation weight set for each feature. Using the weight vector 24, the operating phase 10B, which is described later, performs synonym determinations on a plurality of object nodes that exist in a plurality of target sentences.

Next, generation processing of the characteristic vector 23 according to the first embodiment is described with reference to FIG. 6A to FIG. 6D. FIG. 6A to FIG. 6D are diagrams illustrating one example of the characteristic vector generation processing according to the first embodiment. Noted that one pair of the training data 21 that is subjected to the semantic analysis processing by the semantic analysis unit 11 is as follows. The one pair of the training data 21 is a pair of the term "kasutamaizu" to be determined together with an original sentence (example question sentence) z1 "Unyoukankyou no kasutamaizu ga hitsuyou desu." and the term "henkou" to be determined together with an original sentence (example question sentence) z2 "Unyoukankyou no henkou niyori, taisho ga hitsuyou desu.".

Figure 6A:
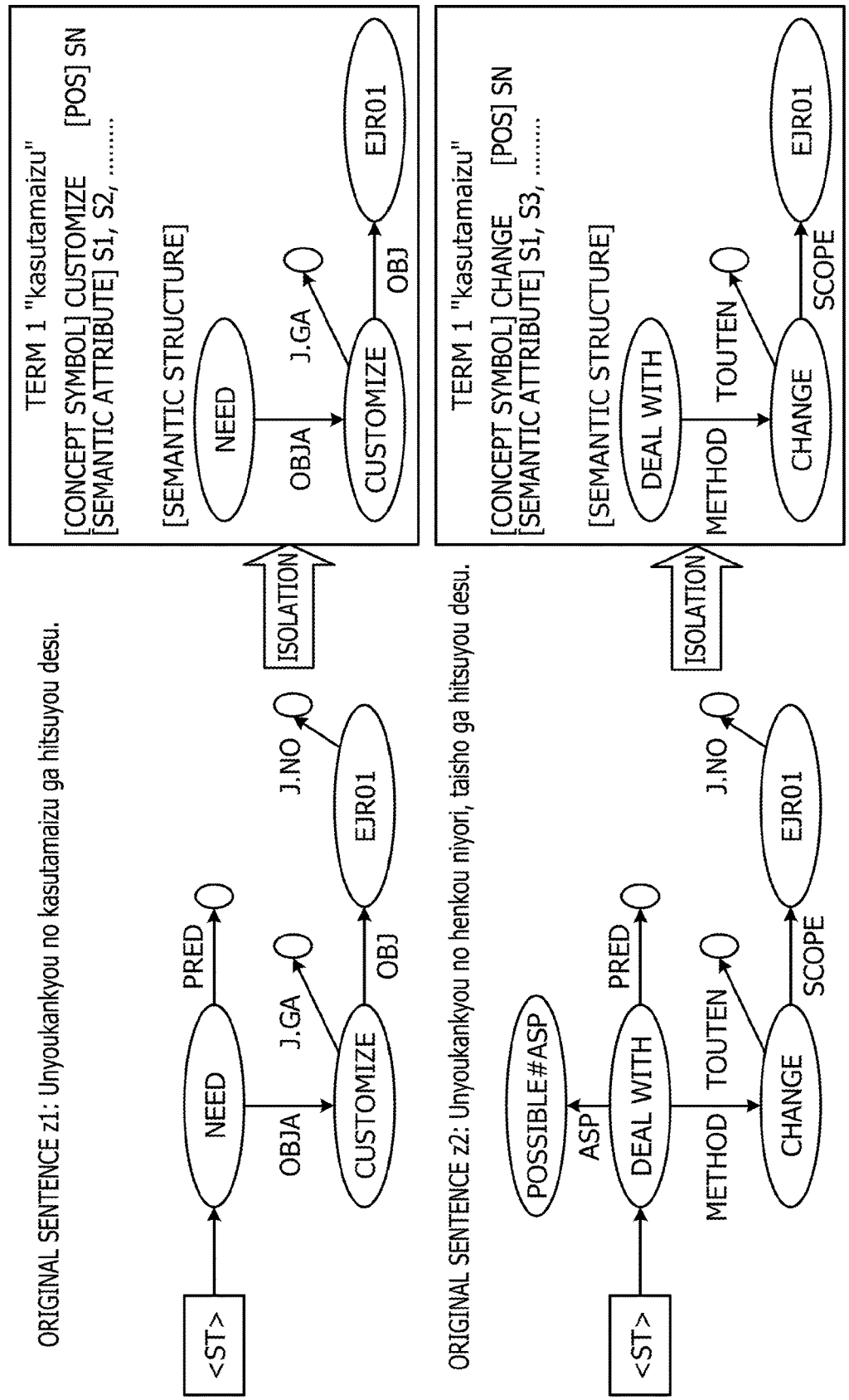
FIG. 6A is a diagram (1) illustrating one example of characteristic vector generation processing according to the first embodiment.

It is assumed that as for the original sentence z1 "Unyoukankyou no kasutamaizu ga hitsuyou desu.", the semantic analysis unit 11 generates the semantic structure 22 as illustrated in FIG. 6A. An upper-left diagram in FIG. 6A illustrates the semantic structure 22 of the original sentence z1 "Unyoukankyou no kasutamaizu ga hitsuyou desu.". For example, in the semantic structure 22, "NEED" is a concept symbol representing a concept for the term "hitsuyou", "CUSTOMIZE" is a concept symbol representing a concept for the term "kasutamaizu", and "EJR01" is a concept symbol representing a concept for the term "unyoukankyou". Moreover, "OBJA", "J.GA", "OBJ", and others in the semantic structure 22 each are a symbol of an arc indicating a relationship between the concepts. It is assumed that as for the original sentence z2 "Unyoukankyou no henkou niyori, taisho ga hitsuyou desu.", the semantic analysis unit 11 generates the semantic structure 22. A lower-left diagram in FIG. 6A is the semantic structure 22 of the original sentence z2 "Unyoukankyou no henkou niyori, taisho ga hitsuyou desu.". For example, in the semantic structure 22 "DEAL WITH" is a concept symbol representing a concept for the term "taisho", "CHANGE" is a concept symbol representing a concept for the term "henkou", and "EJR01" is a concept symbol representing a concept for the term "unyoukankyou". Moreover, "METHOD", "TOUTEN", "SCOPE", and others in the semantic structure 22 each are a symbol of an arc indicating a relationship between the concepts.

Further, regarding the semantic structure 22 of the original sentence z1, the characteristic vector generation unit 12 isolates an object node for the determination target term "kasutamaizu" and its surroundings, as a range for which the characteristic vector 23 is generated, and extracts the semantic structure 22 of the term "kasutamaizu". Herein, regarding the semantic structure 22 of the original sentence z1, the characteristic vector generation unit 12 leaves only related nodes directly connected to the object node with arcs, and deletes the other nodes. An upper-right diagram in FIG. 6A illustrates the semantic structure 22 of a term 1 "kasutamaizu". Further, the term 1 "kasutamaizu" is represented by "CUSTOMIZE" as the concept symbol representing the concept therefor, "SN" as the part of speech, and "S1, S2, . . . " as the semantic attribute.

Further, regarding the semantic structure 22 of the original sentence z2, the characteristic vector generation unit 12 isolates an object node for the determination target term "henkou" and its surroundings as a range for which the characteristic vector 23 is generated, and extracts the semantic structure 22 of the term "henkou". Herein, regarding the semantic structure 22 of the original sentence z2, the characteristic vector generation unit 12 leaves only related nodes directly connected to the object node with arcs, and deletes the other nodes. A lower-right in FIG. 6A illustrates the semantic structure 22 of a term 2 "henkou". Further, the term 2 "henkou" is represented by "CHANGE" as the concept symbol representing a concept therefor, "SN" as the part of speech, and "S1, S3, . . . " as the semantic attribute.

As illustrated in FIG. 6B, the characteristic vector generation unit 12 generates the characteristic vector 23 of the term 1 from the semantic structure 22 indicating a result that the object node for the determination target term 1 "kasutamaizu" and its surroundings are isolated. Herein, the feature of the object node is set in a region for the term 1 of the characteristic vector 23. As for the feature of the part of speech of the term 1, "1" is set as a value for the part of speech (SN), and "0" is set as a value for the other features. As for the feature of the semantic attribute of the term 1, "1" is set as values of S1 and S2, and "0" is set as a value for the other features. As for the feature of the concept symbol representing a concept for the term 1, "1" is set as a value for "CUSTOMIZE", and "0" is set as a value for the other features.

The feature of a related node that is directly connected to the object node with an arc is set in a region for the arc of the characteristic vector 23.

For example, as for the feature of the direction of an arc (OBJA), "1" that indicates a direction from the related node "NEED" towards the object node "CUSTOMIZE" is set. As for the feature of the part of speech of the arc (OBJA), although being not illustrated, "1" is set as a value of the feature of the part of speech of the related node "NEED", and "0" is set as a value for the other features. As for the feature of the semantic attribute of the arc (OBJA), "1" is set as a value of the feature of the semantic attribute of the related node "NEED", and "0" is set as a value for the other features. As for the feature of the concept symbol of the arc (OBJA), "1" is set as a value of the feature of the concept symbol "NEED" of the related node "NEED", and "0" is set as a value for the other features.

Similar to the related node "NEED", also as for a related node "EJR01", the features of the direction, the part of speech, the semantic attribute, and the concept symbol are respectively set in regions for the arc (OBJ).

As illustrated in FIG. 6C, the characteristic vector generation unit 12 generates the characteristic vector 23 of the term 2 from the semantic structure 22 indicating a result that the object node for the determination target term 2 "henkou" and its surroundings are isolated. Herein, the feature of the object node is set in a region for the term 2 of the characteristic vector 23. As for the feature of the part of speech of the term 2, "1" is set as a value for the part of speech (SN), and "0" is set as a value for the other features. As for the feature of the semantic attribute of the term 2, "1" is set as values of S1 and S3, and "0" is set as a value for the other features. As for the feature of the concept symbol representing a concept for the term 2, "1" is set as a value for "CHANGE", and "0" is set as a value for the other features.

The feature of a related node that is directly connected to the object node with an arc is set in a region for the arc of the characteristic vector 23.

For example, as for the feature of the direction of the arc (METHOD), "1" that indicates a direction from the related node a related node "DEAL WITH" to the object node "CHANGE" is set. As for the feature of the part of speech of the arc (METHOD), although being not illustrated, "1" is set as a value of the feature of the part of speech of the related node "DEAL WITH", and "0" is set as a value for the other features. As for the feature of the semantic attribute of the arc (METHOD), "1" is set as a value of the feature of the semantic attribute of the related node "DEAL WITH", and "0" is set as a value for the other features. As for the feature of the concept of the symbol of the arc (METHOD), "1" is set as a value of the feature of the concept symbol "DEAL WITH" of the related node "DEAL WITH", and "0" is set as a value for the other features.

Similar to the related node "DEAL WITH", also as for a related node "EJR-0204485", the features of the direction, the part of speech, the semantic attribute, and the concept symbol are all set in regions for an arc (SCOPE).

As illustrated in FIG. 6D, the characteristic vector generation unit 12 compares the characteristic vector 23 of the term 1 with the characteristic vector 23 of the term 2, and generates the characteristic vector 23 as a comparison result. Herein, the characteristic vector generation unit 12 successively compares the features between the characteristic vector 23 of the term 1 and the characteristic vector 23 of the term 2 from the head features, and generates the characteristic vector 23 as a comparison result in which the value of the matched feature is set to 1 and the value of the unmatched feature is set to 0.

Thereafter, the characteristic vector generation unit 12 connects the characteristic vector 23 of the term 1, the characteristic vector 23 of the term 2, and the characteristic vector 23 as a comparison result to generate the characteristic vector 23 for machine learning.

Figure 7:
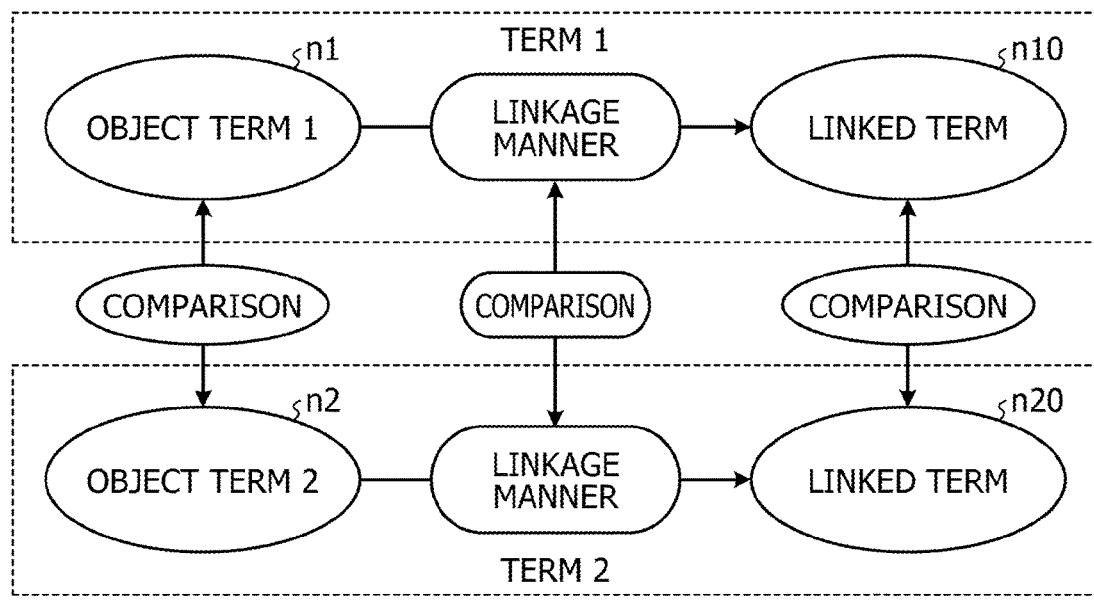
FIG. 7 is a diagram illustrating the property of a characteristic vector according to the first embodiment.

Herein, the property of the characteristic vector 23 according to the first embodiment is described with reference to FIG. 7. FIG. 7 is a diagram illustrating the property of a characteristic vector according to the first embodiment.

As illustrated in FIG. 7, the characteristic vector 23 includes, as for an object node n1 for a learning object term 1, features indicating the characteristics of the term 1 including the semantic property thereof, such as the part of speech, the semantic attribute, and the concept symbol. This allows the learning unit 13 to learn by considering the independent properties of the learning object term 1. The characteristic vector 23 includes, as for an object node n2 for a learning object term 2, features indicating the characteristics of the term 2 including the semantic property thereof, such as the part of speech, the semantic attribute, and the concept symbol. This allows the learning unit 13 to learn by considering the independent properties of the learning object term 2.

As illustrated in FIG. 7, the characteristic vector 23 includes, as for a related node n10 for a term that is semantically linked to the learning object term 1, together with the arc name and the direction of the arc indicating the linkage manner, features indicating the characteristics of the related node n10 including the semantic property thereof, such as the part of speech, the semantic attribute, and the concept symbol. This allows the learning unit 13 to learn by considering the usage of the learning object term 1 in the original sentence z1 (for example, see FIG. 6A) that is a learning object sentence. The characteristic vector 23 includes, as for a related node n20 for a term that is semantically linked to a learning object term 2, together with the arc name and the direction of the arc indicating the linkage manner, features indicating the characteristics of the related node including the semantic property thereof, such as the part of speech, the semantic attribute, and the concept symbol of the related node n20. This allows the learning unit 13 to learn by considering the usage of the learning object term 2 in the original sentence z2 (for example, see FIG. 6A) that is a learning object sentence.

As illustrated in FIG. 7, the characteristic vector 23 for machine learning has the characteristic vector 23 as a comparison result obtained by the comparison between the characteristic vectors 23 of a pair of terms (term 1 and term 2), as a feature. This allows the learning unit 13 to perform learning that implements the determination in which the properties, which include not only the single term but also the usage, between the terms generated due to the combination of the pair of terms (term 1, term 2) are considered in more details.

Referring back to FIG. 1, the operating phase 10B receives an input of a determination target document, refers to the weight vector 24 derived in the learning phase 10A, and performs a synonym determination on a term that is present in the inputted document. The operating phase 10B includes a semantic analysis unit 14, a characteristic vector generation unit 15, and a determination unit 16. Noted that the semantic analysis unit 14 is one example of a reception unit and a first generation unit. The characteristic vector generation unit 15 is one example of a second generation unit. The determination unit 16 is one example of a determination unit.

The semantic analysis unit 14 successively selects sentences from the inputted determination target document. The semantic analysis unit 14 performs a morpheme analysis and a semantic analysis to the selected sentence, and generates the semantic structure 22. This semantic analysis unit 14 may be implemented by the processing the same as that by the semantic analysis unit 11 in the learning phase 10A described above.

The characteristic vector generation unit 15 generates the characteristic vector 23 from a pair of two determination target terms.

For example, the characteristic vector generation unit 15 selects, from the semantic structure 22 for every sentence generated by the semantic analysis unit 14, respective nodes (determination target node) for multiple terms as determination targets. The characteristic vector generation unit 15 isolates the selected determination target node and its surroundings, as a range for which the characteristic vector 23 is generated. As one example, regarding the semantic structure 22 including the selected determination target node, the characteristic vector generation unit 15 leaves only nodes (related nodes) directly connected to the determination target node with arcs, and deletes the other nodes. The determination target node herein may be narrowed down based on the following determination rules. For example, the part of speech of the determination target node is any of parts of speech having a possibility to correspond to the determination target, such as an adjective, a noun (including an adverbial noun, a unique noun, a noun with sa irregular conjugation), and a verb (including an adjective verb). The term for the determination target node is an independent word.

Further, the characteristic vector generation unit 15 may conduct the grouping of the selected determination target nodes that may become synonyms. The grouping herein may be conducted based on the following rules. For example, nodes have the same part of speech set in advance.

Further, the characteristic vector generation unit 15 selects two nodes included in the group for every group having been grouped, and generates the characteristic vectors 23 respectively from pairs of terms of the selected two nodes. The generation method of the characteristic vector 23 is similar to the generation method of the characteristic vector 23 in the characteristic vector generation unit 12. In other words, the characteristic vector for machine learning that is used in the learning phase described above and the characteristic vector as a determination target that is used in the operating phase have the same structure. The characteristic vector generation unit 15 generates the characteristic vectors 23 respectively from the two semantic structures 22 that correspond to the selected two nodes and indicate the results of the surrounding isolation, and generates the characteristic vector 23 as a comparison result that the generated the two characteristic vectors 23 are compared. Further, the characteristic vector generation unit 15 connects the three generated characteristic vectors 23, in other words, the two characteristic vectors 23 respectively generated from the two semantic structures 22 and the characteristic vector 23 as a comparison result to generate the characteristic vector 23 as a determination target. Noted that the two nodes included in the group are selected in a round-robin manner without being overlapped, however, a combination of nodes having no possibility may be reduced in advance. For example, the rough narrowing technique disclosed in Japanese Patent No. 5585472 may be used.

The determination unit 16 inputs the characteristic vectors 23 as determination targets generated from pairs of terms of two nodes into the machine learning device, and determines whether each pair of the terms is a synonym. For example, the determination unit 16 inputs the characteristic vector 23 as a determination target that is generated by the characteristic vector generation unit 15 into the machine learning device, performs evaluation regarding the characteristic vector 23 using the weight vector 24 that is already generated in the learning phase 10A, and derives overall evaluation values by the machine learning device. As one example, the determination unit 16 calculates an inner product of the characteristic vector 23 that is generated by the characteristic vector generation unit 15 and the weight vector 24 that is already generated in the learning phase 10A, and derives an overall evaluation value. The determination unit 16 then determines the derived overall evaluation value with a threshold set in advance accordingly to decide a determination result indicating whether the pair of the terms is a synonym. The determination unit 16 then outputs the decided determination result. Further, the threshold may be changed as appropriate based on the evaluation result.

Herein, synonym determination processing according to the first embodiment is described with reference to FIG. 8. FIG. 8 is a diagram illustrating one example the synonym determination processing according to the first embodiment. As illustrated in FIG. 8, the determination unit 16 inputs the characteristic vectors 23 as determination targets that are generated from the pairs of terms into the machine learning device. Herein, as for the characteristic vectors 23, $(x_{101})$, $(x_{102})$, and $(x_{103})$ are inputted. $(x_{101})$, $(x_{102})$, and $(x_{103})$ are the characteristic vectors 23 as determination targets that are generated respectively from the different pairs of terms.

The determination unit 16 perform evaluation regarding the inputted characteristic vectors 23 as determination targets using the weight vector 24 that is already generated in the learning phase 10A, and derives overall evaluation values by the machine learning device. Herein, the determination unit 16 calculates an inner product of the characteristic vector 23 of $(x_{101})$ and the weight vector 24 that is a machine learning result, and derives $y_{101}$ (0.8654) as an overall evaluation value. The determination unit 16 calculates an inner product of the characteristic vector 23 of $(x_{102})$ and the weight vector 24 that is a machine learning result, and derives $y_{102}$ (−2.0937) as an overall evaluation value.

The determination unit 16 calculates an inner product of the characteristic vector 23 of $(x_{103})$ and the weight vector 24 that is a machine learning result, and derives $y_{103}$ (1.5789) as an overall evaluation value.

The determination unit 16 then determines the derived overall evaluation value with a threshold accordingly to decide a determination result indicating whether the pair of the words is a synonym. Herein, the threshold is ±1 when the margin derived by the machine learning device as the standard is 1. In other words, an upper-level threshold for determination indicating that the pair of the terms is a synonym is 1, and a lower-level threshold for determination indicating that the pair of the terms is not a synonym is −1. Therefore, the overall evaluation value $y_{101}$ (0.8654) that is derived for the characteristic vector 23 of $(x_{101})$ is within the range between the upper-level threshold and the lower-level threshold, and thus is determined that the determination is impossible. The overall evaluation value $y_{102}$ (−2.0937) that is derived for the characteristic vector 23 of $(x_{102})$ is less than the lower-level threshold, and thus is determined as being not a synonym. The overall evaluation value $y_{103}$ (1.5789) that is derived for the characteristic vector 23 of $(x_{103})$ is more than the upper-level threshold, and thus is determined as being a synonym.

[Flowchart of Synonym Determination Processing]

Figure 9:
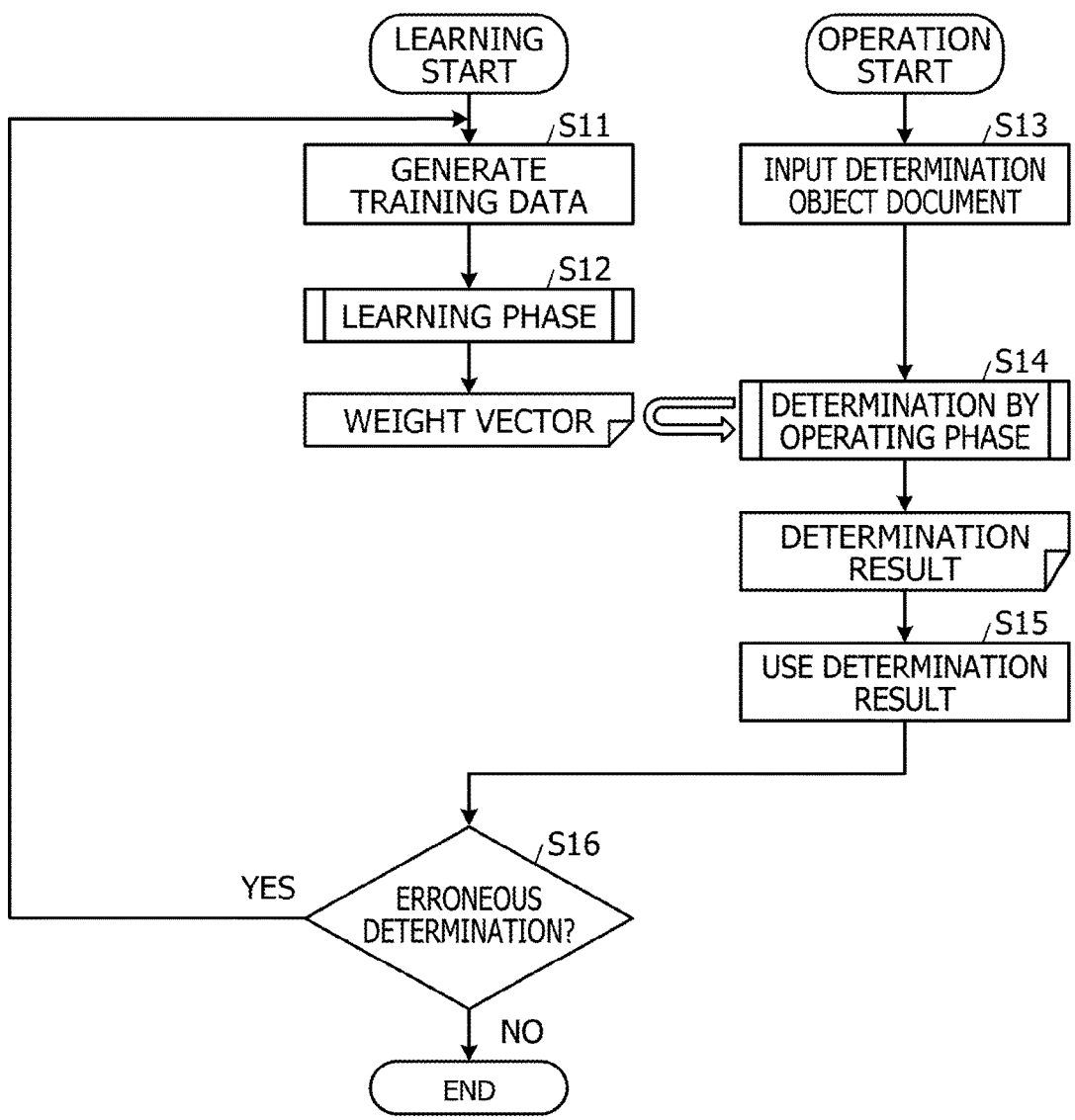
FIG. 9 is a diagram illustrating one example of a flowchart of the synonym determination processing according to the first embodiment.

FIG. 9 is a diagram illustrating one example of a flowchart of synonym determination processing according to the first embodiment.

Firstly, the synonym determination processing causes a user to generate the training data 21 related to the synonym determination (Step S11). The training data 21 of the positive example is a pair of information each including a determination target term as being a synonym together with a sentence in an example question. The training data 21 of the negative example is a pair of information each including a determination target term as being not a synonym together with a sentence in an example question.

The synonym determination processing then inputs the generated training data 21 into the learning phase 10A (Step S12), and derives the weight vector 24 as a learning result using a machine learning device. Further, a flowchart of the learning phase 10A is described later.

The synonym determination processing next inputs a document as a determination target (Step S13).

Then, the synonym determination processing is performed refers to, regarding the inputted document, the already derived weight vector 24, by the operating phase 10B (Step S14). Further, a flowchart of the operating phase 10B is described later.

The synonym determination processing causes the user to utilize a determination result (Step S15). The user determines whether the determination is an erroneous determination (Step S16). If the user determines that the determination is an erroneous determination (Step S16; Yes), the synonym determination processing shifts to Step S11, in order to use the erroneously determined example question as the new training data 21, as a feedback.

In contrast, if the user determines that the determination is not an erroneous determination (Step S16; No), the synonym determination processing ends.

[Flowchart of Learning Phase]

Figure 10:
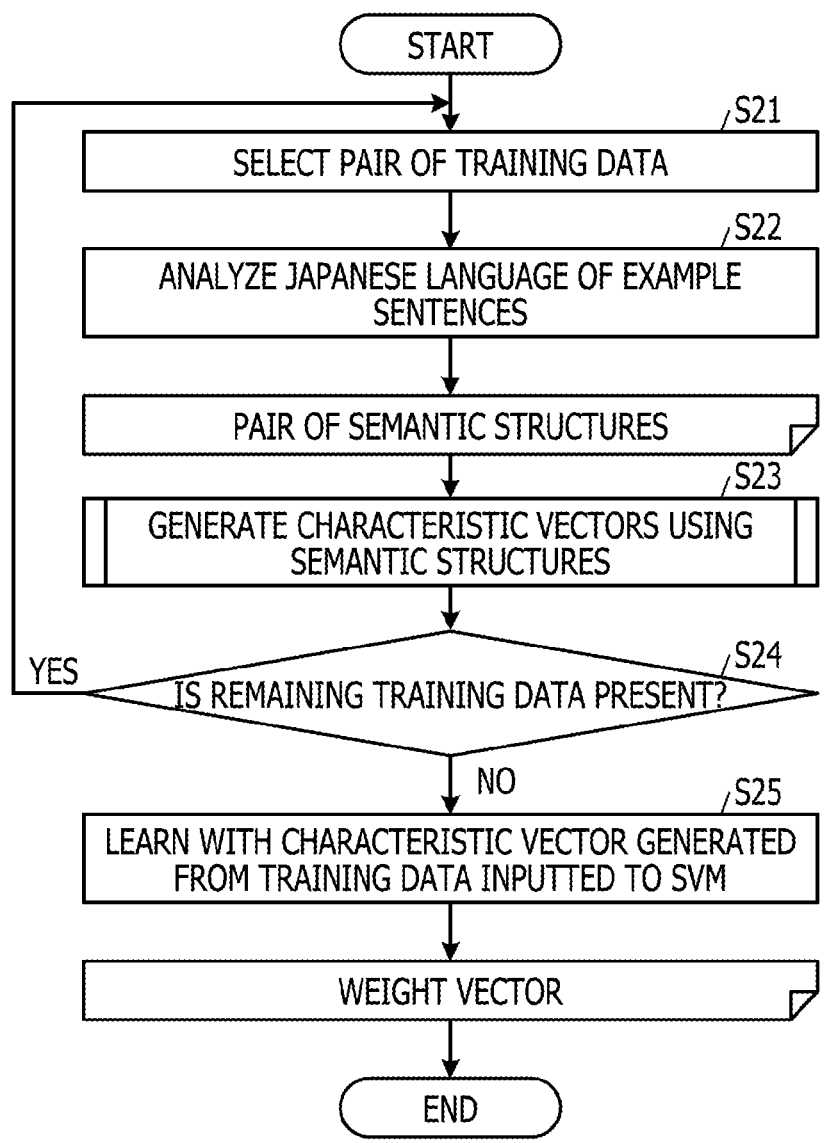
FIG. 10 is a diagram illustrating one example of a flowchart of the learning phase according to the first embodiment.

FIG. 10 is a diagram illustrating one example of a flowchart of learning phase according to the first embodiment.

As illustrated in FIG. 10, the semantic analysis unit 11 selects, out of the inputted training data 21, a pair of the training data 21 (Step S21). The semantic analysis unit 11 performs Japanese language analysis processing including a semantic analysis to sentences of the pair of the examples indicated in the selected training data 21 (Step S22), and generates respective pairs of semantic structures 22. The processing to the Japanese language sentences is herein described as an example, however, suitable language analysis processing is performed at Step S22 depending on the language of the inputted example question sentences. For example, in a case of English language example question sentences, English language analysis processing is performed.

The characteristic vector generation unit 12 uses the generated pair of the semantic structures 22 to generate the characteristic vector 23 for machine learning (Step S23). Further, a flowchart of generation processing of the characteristic vector 23 is described later.

The semantic analysis unit 11 then determines whether the remaining training data 21 is present (Step S24). If the semantic analysis unit 11 determines that the remaining training data 21 is present (Step S24; Yes), the semantic analysis unit 11 shift the processing to Step S21 in order to select the next training data 21.

In contrast, if the semantic analysis unit 11 determines that the remaining training data 21 is not present (Step S24; No), the learning unit 13 learns by inputting the characteristic vector 23 generated from the training data 21 into the SVM (Step S25). As a result, the weight vector 24 is generated as a learning result. The learning phase 10A then ends.

[Flowchart of Feature Vector Generation Processing]

Figure 11:
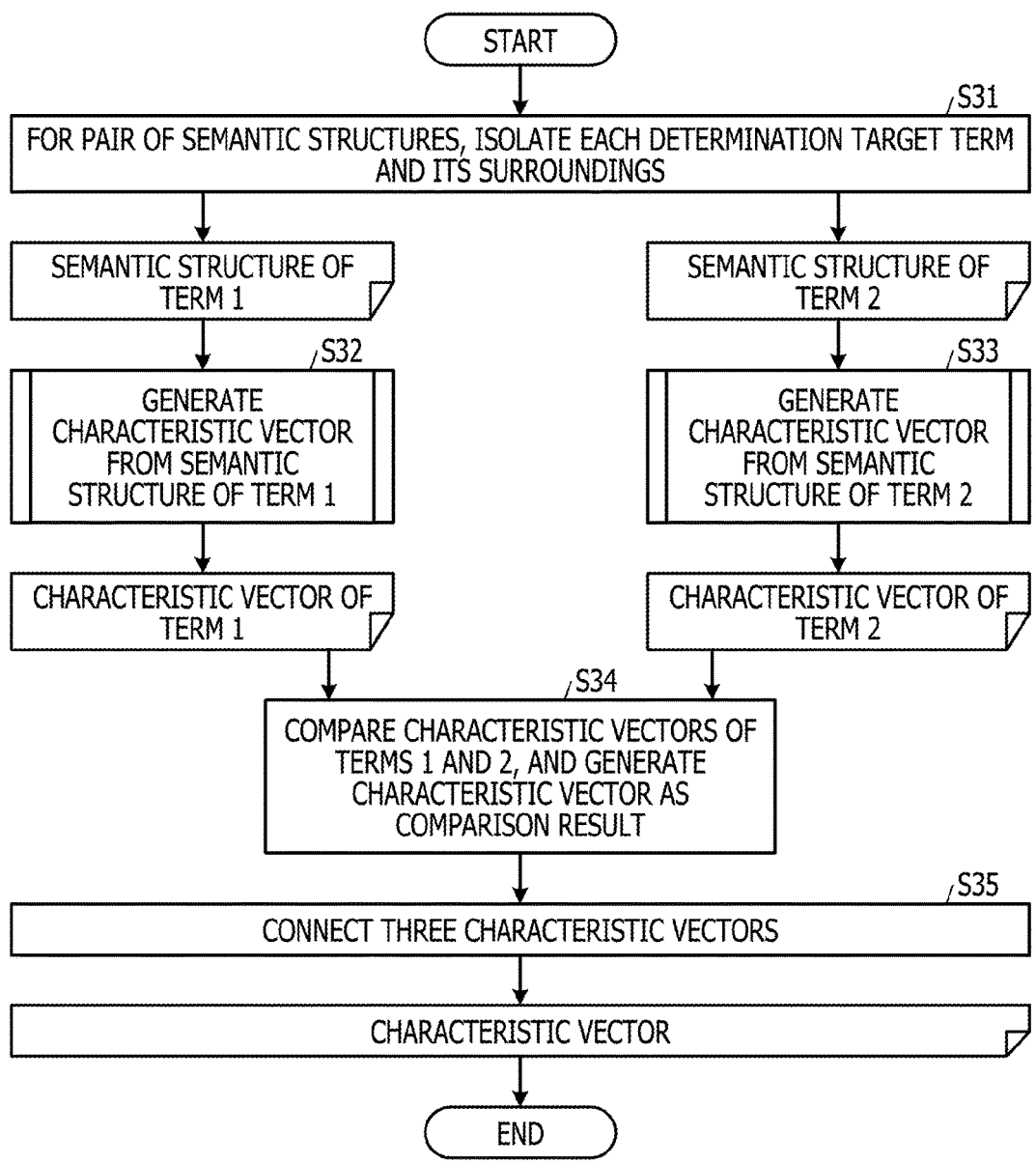
FIG. 11 is a diagram illustrating one example of a flowchart of the characteristic vector generation processing according to the first embodiment.

FIG. 11 is a diagram illustrating one example of a flowchart of characteristic vector generation processing according to the first embodiment.

As illustrated in FIG. 11, regarding the pair of the semantic structures 22, the characteristic vector generation unit 12 isolates a node (object node) for each of the determination target terms and its surroundings (Step S31). Herein, the determination target terms are described as a term 1 and a term 2.

The characteristic vector generation unit 12 generates the characteristic vector 23 from the semantic structure 22 of the term 1 (Step S32). Further, a flowchart of processing of generating the characteristic vector 23 from the semantic structure 22 of the term is described later. The characteristic vector generation unit 12 shifts the processing to Step S34.

The characteristic vector generation unit 12 generates the characteristic vector 23 from the semantic structure 22 of the term 2 (Step S33). Further, a flowchart of processing of generating the characteristic vector 23 from the semantic structure 22 of the term is described later. The characteristic vector generation unit 12 shifts the processing to Step S34.

At Step S34, the characteristic vector generation unit 12 compares the respective characteristic vectors 23 of the terms 1 and 2, and generates the characteristic vector 23 as a comparison result (Step S34). For example, the characteristic vector generation unit 12 successively compares values of the feature from the head features between the characteristic vector 23 of a term 1 and the characteristic vector 23 of a term 2, and generates the characteristic vector 23 as a comparison result in which the value of the matched feature is set to 1 and the value of the unmatched feature is set to 0.

The characteristic vector generation unit 12 then connects the three the characteristic vectors 23 (Step S35). In other words, the characteristic vector generation unit 12 connects the characteristic vector 23 of the term 1, the characteristic vector 23 of the term 2, and the characteristic vector 23 as a comparison result to generate the characteristic vector 23 for machine learning. The characteristic vector generation unit 12 ends the characteristic vector generation processing.

[Flowchart of Processing of Generating Feature Vector from Semantic Structure of Term]

Figure 12:
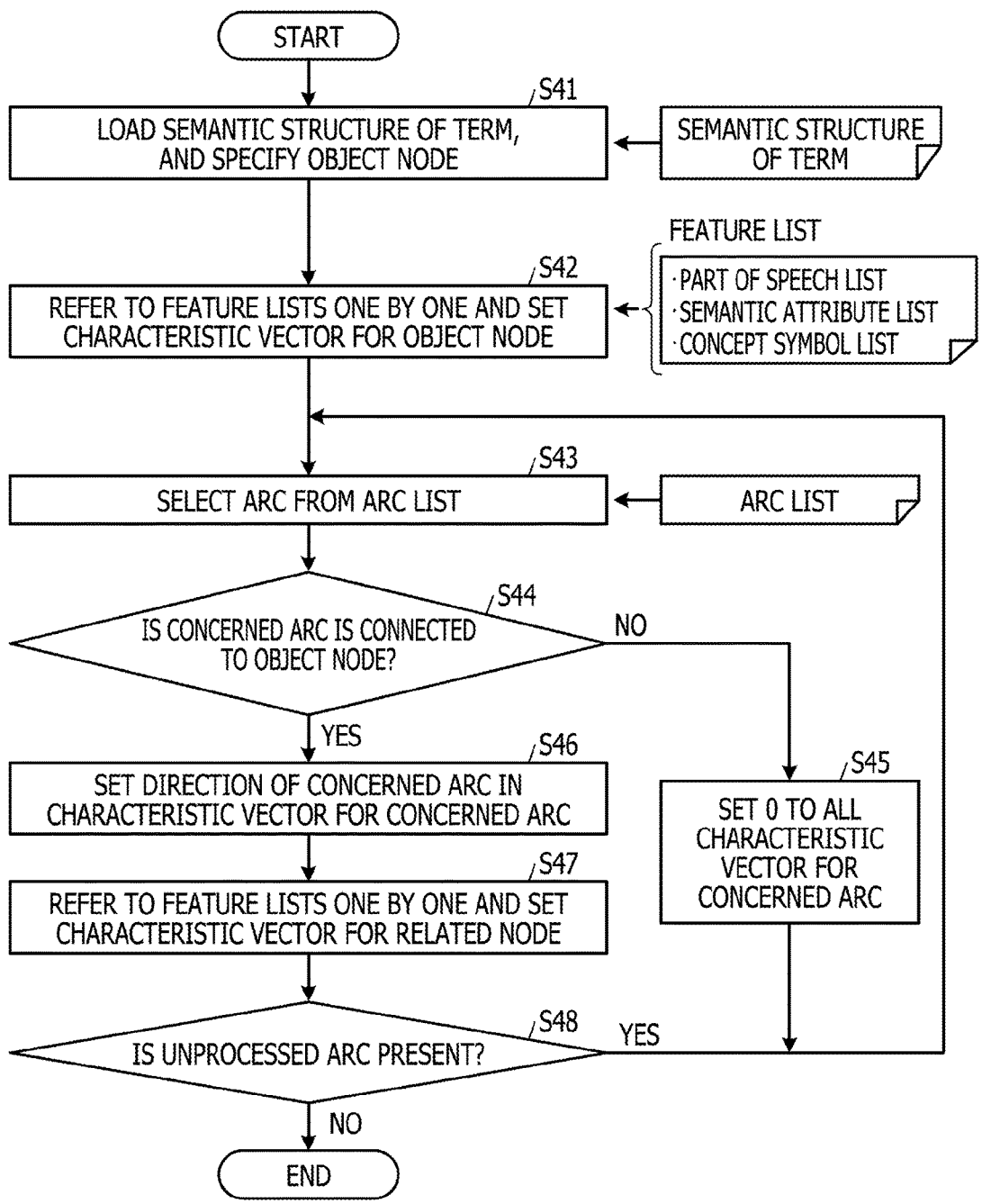
FIG. 12 is a diagram illustrating one example of a flowchart of processing of generating a characteristic vector from a semantic structure of a term.

FIG. 12 is a diagram illustrating one example a flowchart of processing of generating a characteristic vector from the semantic structure of the term.

As illustrated in FIG. 12, the characteristic vector generation unit 12 loads the semantic structure 22 of a determination target term, and specifies an object node for the term (Step S41). For example, the characteristic vector generation unit 12 specifies, from the semantic structure 22 of the determination target term, an object node including a concept symbol for the expression of the term.

The characteristic vector generation unit 12 successively refers to feature lists defined in advance, and sets the characteristic vector 23 for the object node (Step S42). The feature list herein is a list in which elements to be applied as features are defined, and includes a part of speech list, a semantic attribute list, and a concept symbol list. The part of speech list is a list of parts of speech having a possibility to appear as a part of speech of the object node. The semantic attribute list is a list of semantic attributes having a possibility to appear as a semantic attribute of the object node. The concept symbol list is a list of concept symbols having a possibility to appear as a concept symbol of the object node. For example, the characteristic vector generation unit 12 refers to the feature list, and sets a value of the feature in which an element of the object node is present to 1 and a value of the feature in which an element of the object node is not present to 0, thereby setting an area of information i0 (see FIG. 4) on the object node of the characteristic vector 23.

The characteristic vector generation unit 12 selects an arc from an arc list (Step S43). The arc list herein is a list of arcs in which arcs having a possibility to be connected to the object node are defined. The characteristic vector generation unit 12 determines whether the selected arc (the concerned arc) is connected to the object node (Step S44).

If the characteristic vector generation unit 12 determines that the concerned arc is not connected to the object node (Step S44; No), the characteristic vector generation unit 12 sets 0 to all the characteristic vector 23 for the concerned arc (Step S45). For example, the characteristic vector generation unit 12 sets 0 as values of the features for all the elements defined in the feature list and a value of the feature of the direction of the arc to 0 in an area of the concerned arc in information i10 (see FIG. 4) on a related node of the characteristic vector 23. The characteristic vector generation unit 12 then shifts the processing to Step S43 in order to select the next arc.

In contrast, the characteristic vector generation unit 12 determines that the concerned arc is connected to the object node (Step S44; Yes), the characteristic vector generation unit 12 sets the direction of the concerned arc in the characteristic vector 23 for the concerned arc (Step S46). For example, the characteristic vector generation unit 12 sets 0 when the direction directs the outside from the object node (OUT arc), and 1 when the direction directs from the outside to the object node (IN arc), in the direction of the concerned arc in the information i10 on the related node of the characteristic vector 23.

The characteristic vector generation unit 12 then successively refers to the feature lists, and sets the characteristic vector 23 for the related node (Step S47). For example, the characteristic vector generation unit 12 refers to the feature list, and sets a value of the feature in which an element of the related node is present to 1 and a value of the feature in which an element of the related node is not present to 0, thereby setting an area of the concerned arc in the information i10 on the related node of the characteristic vector 23.

The characteristic vector generation unit 12 then determines whether an unprocessed arc is present in the arc list (Step S48). If the characteristic vector generation unit 12 determines that an unprocessed arc is present (Step S48; Yes), the characteristic vector generation unit 12 then shifts the processing to Step S43 in order to select the next arc.

In contrast, if the characteristic vector generation unit 12 determines that no unprocessed arc is present (Step S48; No), the characteristic vector generation unit 12 ends the processing of generating the characteristic vector 23 from the semantic structure 22 of the term.

[Flowchart of Operating Phase]

Figure 13:
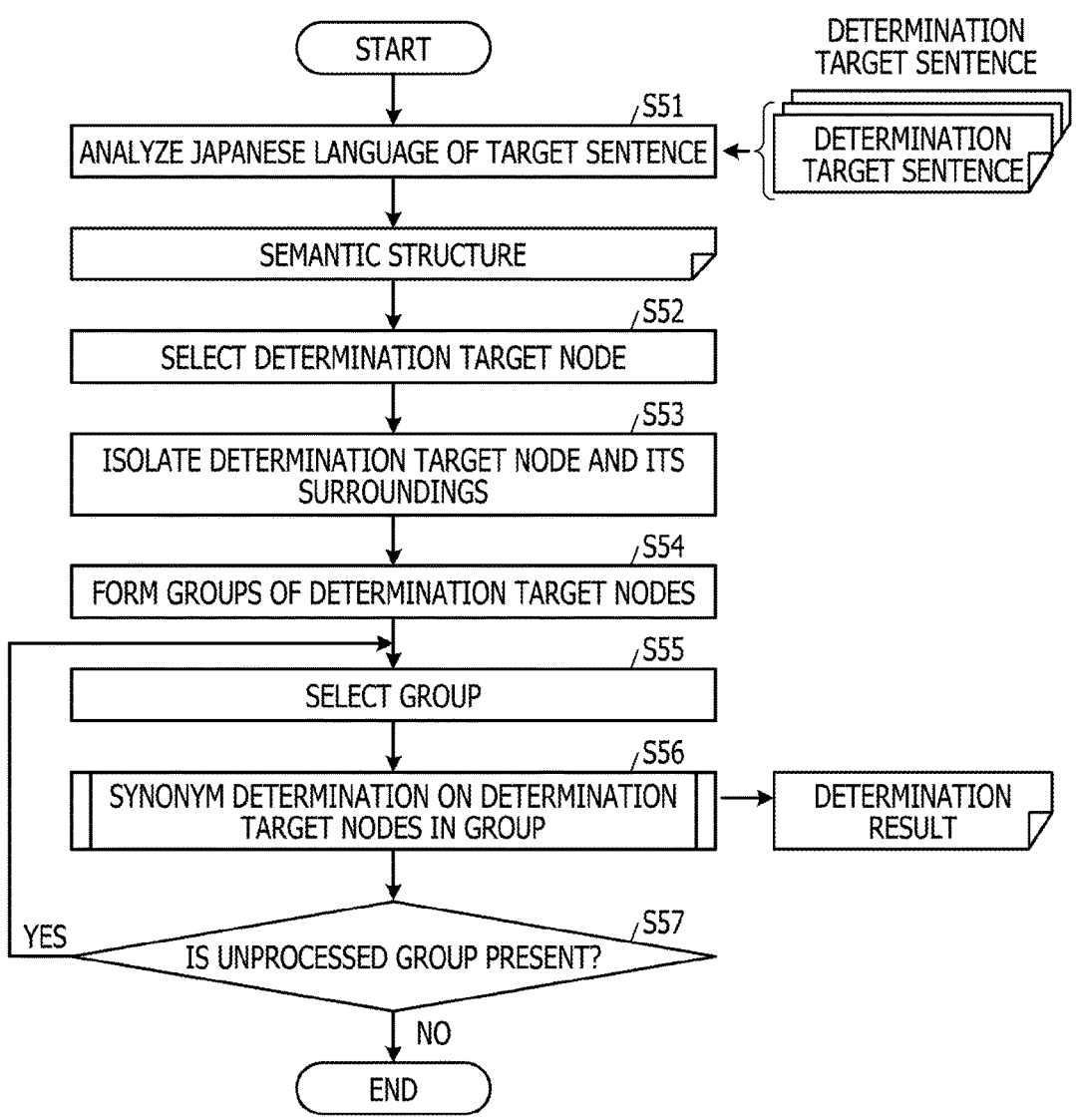
FIG. 13 is a diagram illustrating one example of a flowchart of an operating phase according to the first embodiment.

FIG. 13 is a diagram illustrating one example of a flowchart of an operating phase according to the first embodiment.

As illustrated in FIG. 13, the semantic analysis unit 14 performs Japanese language semantic analysis processing to the inputted target sentences (Step S51), and generates the semantic structures 22. The processing to the Japanese language sentences is herein described as an example, however, suitable language analysis processing is performed at Step S51 depending on the language of inputted target sentences. For example, in a case of English language object sentences, English language analysis processing is performed.

The characteristic vector generation unit 15 selects, regarding the generated the semantic structure 22, a node (determination target node) as a determination target (Step S52). Regarding the generated semantic structure 22, the characteristic vector generation unit 15 isolates the determination target node and its surroundings (Step S53).

Subsequently, the characteristic vector generation unit 15 conduct the grouping of determination target nodes that may become a synonym (Step S54). The characteristic vector generation unit 15 selects a group (Step S55). The characteristic vector generation unit 15 and the determination unit 16 perform a synonym determination on the determination target nodes in the selected group (Step S56). Further, a flowchart of synonym determination processing is described later. The determination unit 16 then outputs a determination result due to the synonym determination.

The characteristic vector generation unit 15 then determines whether an unprocessed group is present (Step S57). If the characteristic vector generation unit 15 determines that an unprocessed group is present (Step S57; Yes), the characteristic vector generation unit 15 shifts the processing to Step S55 in order to select the next group.

In contrast, the characteristic vector generation unit 15 determines that no unprocessed group is present (Step S57; No), the operating phase 10B ends.

[Flowchart of Synonym Determination Processing]

Figure 14:
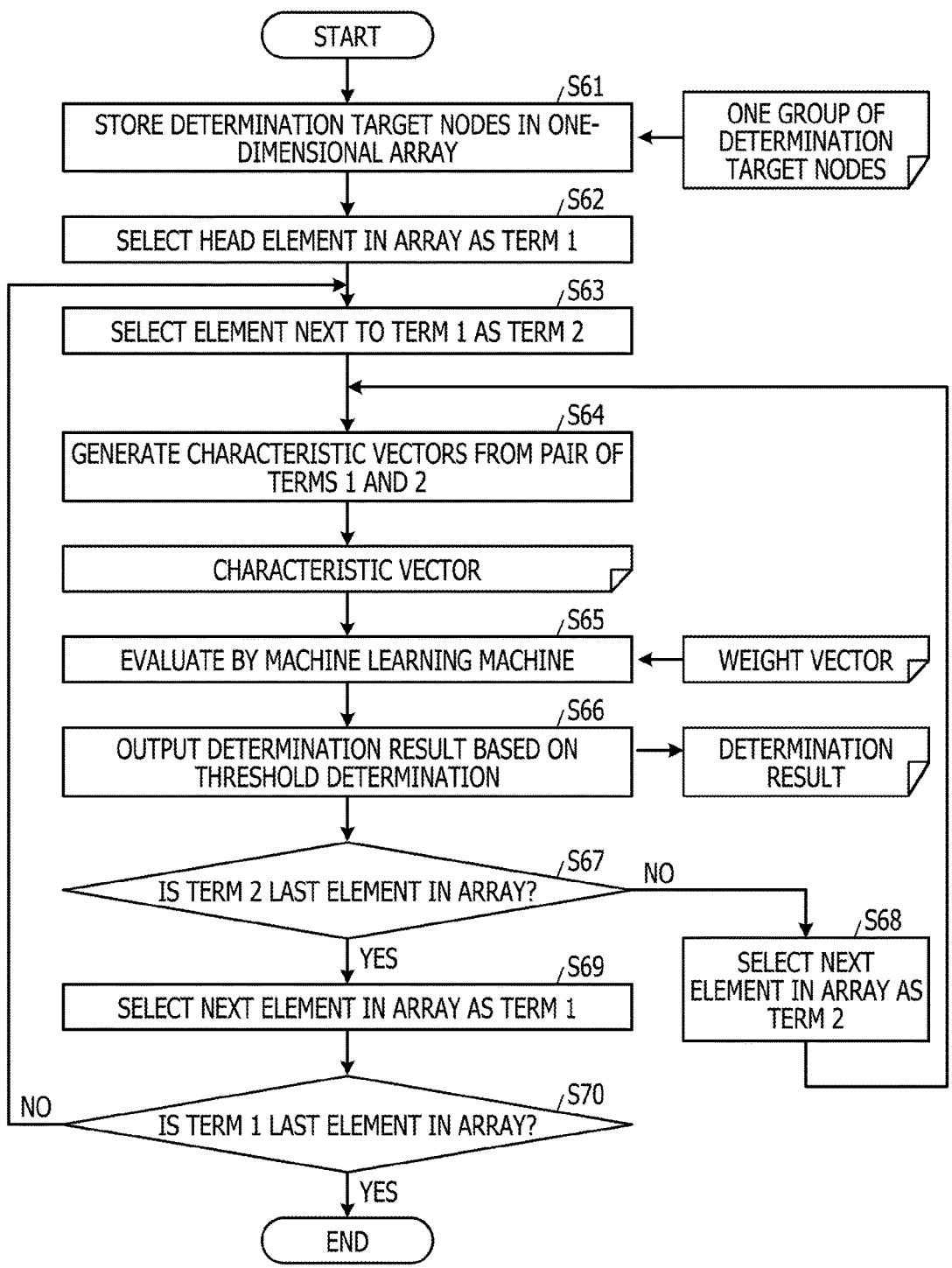
FIG. 14 is a diagram illustrating one example of a flowchart of the synonym determination processing according to the first embodiment.

FIG. 14 is a diagram illustrating one example of a flowchart of synonym determination processing according to the first embodiment.

As illustrated in FIG. 14, the characteristic vector generation unit 15 stores, regarding a group of the inputted determination target nodes, determination target nodes included in the group in an one-dimensional array (Step S61). The characteristic vector generation unit 15 selects the head element in the array as a term 1 (Step S62).

The characteristic vector generation unit 15 selects the next element of the term 1, as a term 2 (Step S63). The characteristic vector generation unit 15 generates the characteristic vectors 23 from the pair of the terms 1 and 2 (Step S64). Noted that a method of generating the characteristic vector 23 from the pair of the terms 1 and 2 is similar to the method thereof by the learning phase 10A (see S32 to 35 in FIG. 11). In other words, the characteristic vector generation unit 15 generates the characteristic vector 23 from the semantic structure 22 of the term 1. The characteristic vector generation unit 15 generates the characteristic vector 23 from the semantic structure 22 of the term 2. The characteristic vector generation unit 15 compares the characteristic vectors 23 of the pair of the terms 1 and 2, and generates the characteristic vector 23 as a comparison result. The characteristic vector generation unit 15 then connects the three characteristic vectors 23, and generates the characteristic vector 23 as a determination target.

Subsequently, the determination unit 16 inputs the generated characteristic vector 23 as a determination target into the machine learning device (SVM), and perform evaluation by the machine learning device using the weight vector 24 that is already generated in the learning phase 10A (Step S65). The determination unit 16 derives an overall evaluation value as an evaluation result. The determination unit 16 determines the derived overall evaluation value as an evaluation result with a threshold set in advance, and outputs a determination result (Step S66).

Subsequently, the characteristic vector generation unit 15 determines whether the term 2 being selected is the last element in the array (Step S67). If the characteristic vector generation unit 15 determines that the term 2 is not the last element in the array (Step S67; No), the characteristic vector generation unit 15 selects the next element in the array as the term 2 (Step S68). The characteristic vector generation unit 15 then shifts the processing to Step S64 in order to evaluate a new pair of terms.

In contrast, the characteristic vector generation unit 15 determines that the term 2 is the last element in the array (Step S67; Yes), the characteristic vector generation unit 15 selects the next element in the array as the term 1 (Step S69).

The characteristic vector generation unit 15 then determines whether the selected term 1 is the last element in the array (Step S70). If the characteristic vector generation unit 15 determines that the term 1 is not the last element in the array (Step S70; No), the characteristic vector generation unit 15 shifts the processing to Step S63 in order to evaluate a new pair of terms.

In contrast, if the characteristic vector generation unit 15 determines that the term 1 is the last element in the array (Step S70; Yes), the synonym determination processing ends.

[Effect of First Embodiment]

In this manner, the information processing apparatus 1 receives a plurality of sentences, designation of terms included in the plurality of sentences. The information processing apparatus 1 analyzes each of the received plurality of sentences, and generates, for each term for which the designation is received, the semantic structure 22 indicating a semantic relation between a semantic node for the term, and the other semantic nodes included in the sentence containing the term. The information processing apparatus 1 extracts, for each term for which the designation is received, the semantic structure 22 indicating a specific relation from the generated semantic structure 22, and generates the characteristic vector 23 that uses information in the extracted semantic structure 22 as a feature. Further, the information processing apparatus 1 inputs the characteristic vector 23 for every generated term into a machine learning device that makes a determination on similarity between the plurality of terms. With this configuration, the information processing apparatus 1 uses the semantic structure 22 indicating a relation between a term for which the designation is received and each of the other terms to generate the characteristic vector 23 that uses information in the semantic structure 22 as a feature, thereby making it possible to obtain a feature indicating the independent property and the usage of the term for which the designation is received. As a result, the information processing apparatus 1 inputs the characteristic vector 23 for every term into the machine learning device to make it possible to improve the determination accuracy related to the similarity between the terms.

Moreover, with the abovementioned first embodiment, the information processing apparatus 1 generates the semantic structure 22 having the following information on a term for which the designation is received. In other words, the information processing apparatus 1 generates the semantic structure 22 including attribute information included in a term for which the designation is received, relation information between the term and each of the other terms included in the sentence containing the term, and attribute information included in the other terms. With this configuration, the semantic structure 22 includes attribute information included in a term, and relation information between the term and the other terms to allow the information processing apparatus 1 to obtain a feature including a relation between the term for which the designation is received and the other terms.

Moreover, with the abovementioned first embodiment, the information processing apparatus 1 extracts, for a term for which the designation is received, a specific semantic structure 22 between the term and the other terms that are directly related to the term from the semantic structure 22, and generates the characteristic vector 23 that uses the extracted information as a feature. With this configuration, the information processing apparatus 1 uses the semantic structure 22 between a term for which the designation is received and between the other term that is directly related to the term to generate the characteristic vector 23, thereby making it possible to obtain a better feature of the term for which the designation is received.

Moreover, with the abovementioned first embodiment, the information processing apparatus 1 extracts, for a first term for which the designation is received, a specific semantic structure 22 from the semantic structure 22 for the first term, and generates a first characteristic vector 23 that uses the extracted specific semantic structure 22 as a feature. The information processing apparatus 1 extracts, for a second term for which the designation is received, a specific semantic structure 22 from the semantic structure 22 for the second term, and generates a second characteristic vector 23 that uses the extracted specific semantic structure 22 as a feature. The information processing apparatus 1 inputs a new characteristic vector 23 in which the first characteristic vector 23, the second characteristic vector 23, and a third characteristic vector 23 indicating a result obtained by comparing the first characteristic vector 23 with the second characteristic vector 23 are connected, into a machine learning device. With this configuration, the machine learning device makes it possible to improve the determination accuracy related to the similarity between the first term and the second term.

Moreover, with the abovementioned first embodiment, the information processing apparatus 1 receives, in addition to a plurality of sentences and designation of terms included in the plurality of sentences, designation of similarity-dissimilarity information indicating whether the terms for which the designation is received have similarity. The information processing apparatus 1 inputs the characteristic vector 23 for every term for which the designation is received, with the similarity-dissimilarity information, into the machine learning device. The information processing apparatus 1 performs learning using the inputted the characteristic vector 23 and the similarity-dissimilarity information, and outputs the weight vector 24 as a learning result. This configuration allows the information processing apparatus 1 to generate the weight vector 24 that is used in determination on the similarity between the terms, with high accuracy.

Moreover, with the abovementioned first embodiment, the information processing apparatus 1 receives a plurality of sentences and designation of determination target terms, which are terms included in the plurality of sentences. The information processing apparatus 1 inputs the characteristic vector 23 for every term for which the designation is received into the machine learning device. The information processing apparatus 1 makes a determination on the similarity between the terms using the weight vector 24 that is outputted as a learning result and the inputted the characteristic vector 23 for every term, and outputs a determination result. This configuration allows the information processing apparatus 1 to improve the determination accuracy related to the similarity between the terms using the weight vector 24 with high accuracy.

[Second Embodiment]

Meanwhile, for the object node for the determination target term (target term), the characteristic vector 23 according to the first embodiment includes the various kinds of features of the part of speech, the various kinds of features of the semantic attribute, and the various kinds of features of the concept symbol. In addition, for a related node for a term that is connected to the target term, the characteristic vector 23 includes the following features for each of arcs, the features including the various kinds of features of the part of speech, the various kinds of features of the semantic attribute, and the various kinds of features of the concept symbol. There are approximate 30 features of the parts of speech. There are approximate 10000 features of the semantic attributes. There are approximate 1000000 features of the concept symbols. There are approximate 700 arcs.

Figure 15:
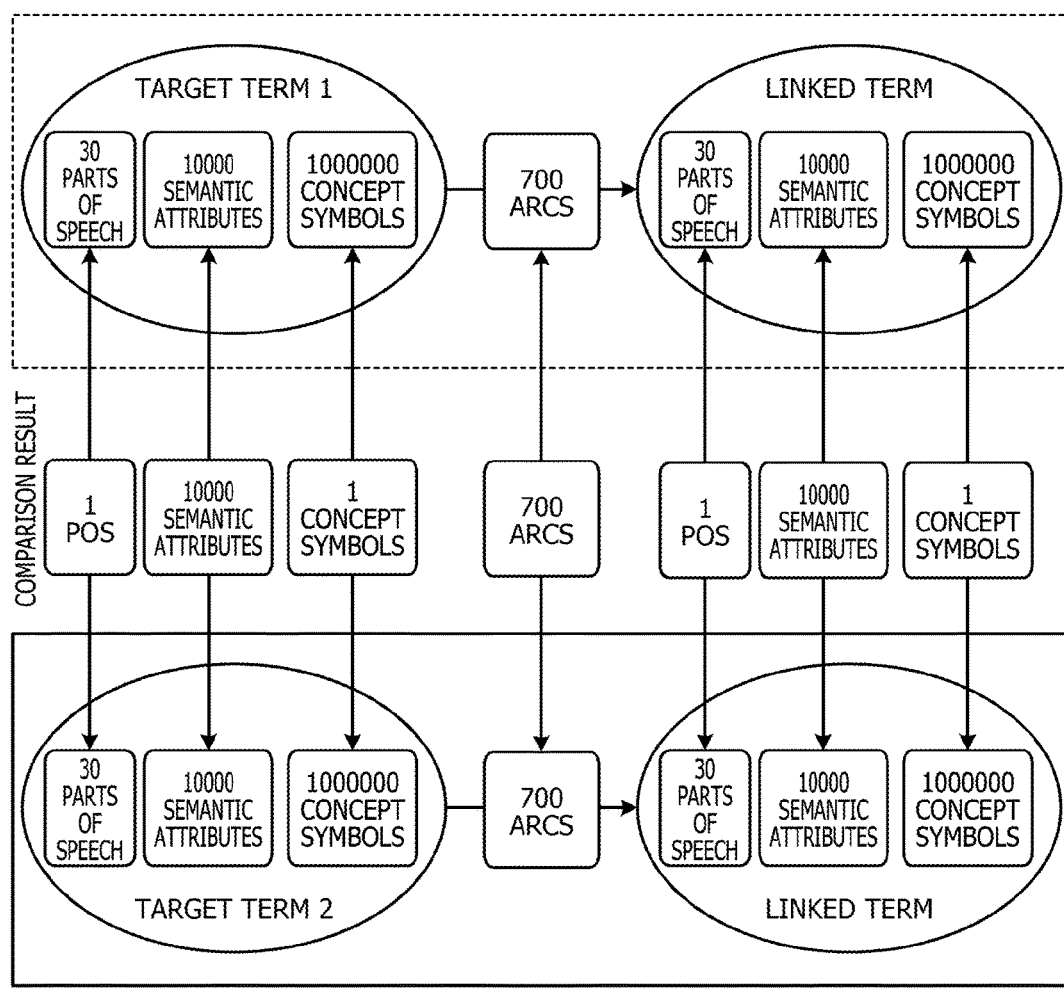
FIG. 15 is a diagram illustrating the concept of a characteristic vector that uses all the characteristic information.

Herein, a conceptual diagram of the characteristic vector 23 that uses all the characteristic information is described with reference to FIG. 15. FIG. 15 is a diagram illustrating the concept of a characteristic vector that uses all the characteristic information. As illustrated in FIG. 15, the characteristic vector 23 with respect to the term 1 for learning or as a determination target includes 30 parts of speech, 10000 semantic attributes, and 1000000 concept symbols. Further, the characteristic vector 23 for terms linked to the term 1 includes the followings for each of 700 arcs: 30 parts of speech, 10000 semantic attributes, and 1000000 concept symbols. Moreover, the characteristic vector 23 with respect to a term 2 for learning or as a determination target includes 30 parts of speech, 10000 semantic attributes, and 1000000 concept symbols. Further, the characteristic vector 23 with respect to a term to be linked to the term 2 includes, for each of 700 arcs, 30 parts of speech, 10000 semantic attributes, and 1000000 concept symbols. Moreover, the characteristic vector 23 as a comparison result between the term 1 and the term 2 includes comparison results related to 1 part of speech, 10000 semantic attributes, and 1 concept symbol. The characteristic vector 23 as a comparison result between the term to be linked to the term 1 and the term to be linked to the term 2 includes, for each of 700 arcs, comparison result related to 1 part of speech, 10000 semantic attributes, and 1 concept symbol.

In other words, the number of dimensions of the characteristic vector 23 that uses all the characteristic information is expressed by the following computational expression (1).

Number of dimensions=((30 parts of speech+10000 semantic attributes+1000000 concept symbols)+ 700 arcs×(30 parts of speech+10000 semantic attributes+1000000 concept symbols))×2+(1 part of speech+10000 semantic attributes+1 concept symbol)+700 arcs×(1 part of speech+ 10000 semantic attributes+1 concept symbol)= 1,423,073,462 dimensions    Expression (1)

However, the characteristic vector 23 is not limited to this, but may be the characteristic vector 23 in which the dimension is compressed indicated below. For example, (1) the part of speech of a target term is a synonym or a polyseme, and is limited to the important approximate 10 parts of speech. (2) the part of speech of a term to be connected (connection destination) is limited to 28 types by reducing two types with low use frequency. (3) the concept symbol is used as a symbol that uniquely distinguished a term, and is limited to only information about matching or unmatching. (4) the semantic attribute is limited to 76 types with high use frequency. (5) the arc is limited to 50 types with high use frequency.

Herein, one example of dimension compression related to the part of speech of a target term is described with reference to FIG. 16. FIG. 16 is a diagram illustrating one example of dimension compression related to the part of speech of a target term. As illustrated in FIG. 16, the part of speech of the target term is limited to the part of speech having a name with "0" set to the selection item. In other words, "adverb", "conjunction, connection postpositional particle", "adnominal", "preposition", and others are excluded because they are not important as a synonym or a polyseme.

Figure 17:
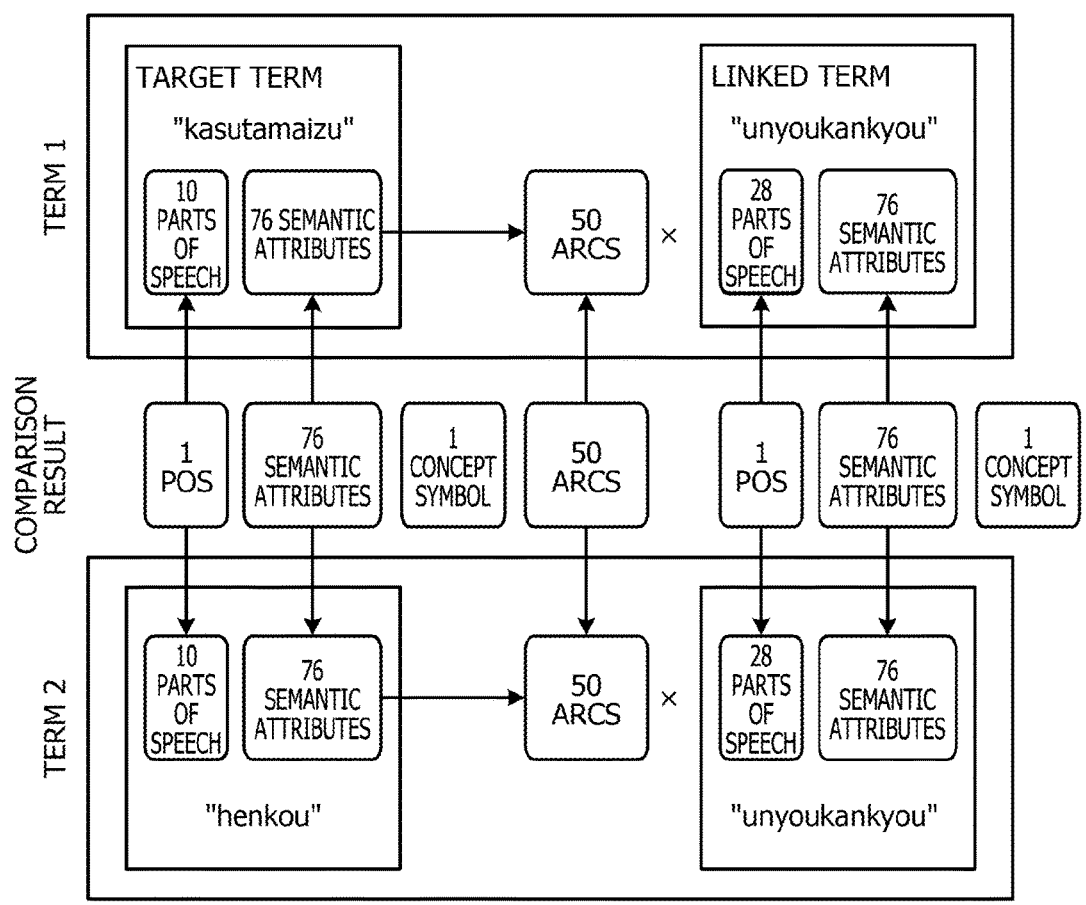
FIG. 17 is a diagram illustrating the concept of the characteristic vector as a dimension compression result according to a second embodiment.

The concept of the characteristic vector 23 with such the compressed dimension is described with reference to FIG. 17. FIG. 17 is a diagram illustrating the concept of the characteristic vector as a dimension compression result according to a second embodiment. As illustrated in FIG. 17, the characteristic vector 23 for a term 1 as a determination target includes 10 parts of speech and 76 semantic attributes. Further, the characteristic vector 23 for a term to be linked to the term 1 includes, for each of 50 arcs, 28 parts of speech and 76 semantic attributes. Noted that the concept symbol representing a concept of term 1 is only information about matching and unmatching, and thus is omitted. Moreover, the characteristic vector 23 for the term 2 as a determination target includes 10 parts of speech and 76 semantic attributes. Further, the characteristic vector 23 for a term to be linked to the term 2 includes, for each of 50 arcs, 28 parts of speech and 76 semantic attributes. Noted that the concept symbol representing a concept of term 2 is only information about matching and unmatching, and thus is omitted. Moreover, the characteristic vector 23 as a comparison result between the term 1 and the term 2 includes comparison results related to 1 part of speech, 76 semantic attributes, and 1 concept symbols. The characteristic vector 23 as a comparison result between the term to be linked to the term 1 and the term to be linked to the term 2 includes, for each of 50 arcs, comparison results related to 1 part of speech, 76 semantic attributes, and 1 concept symbol.

Figure 18:
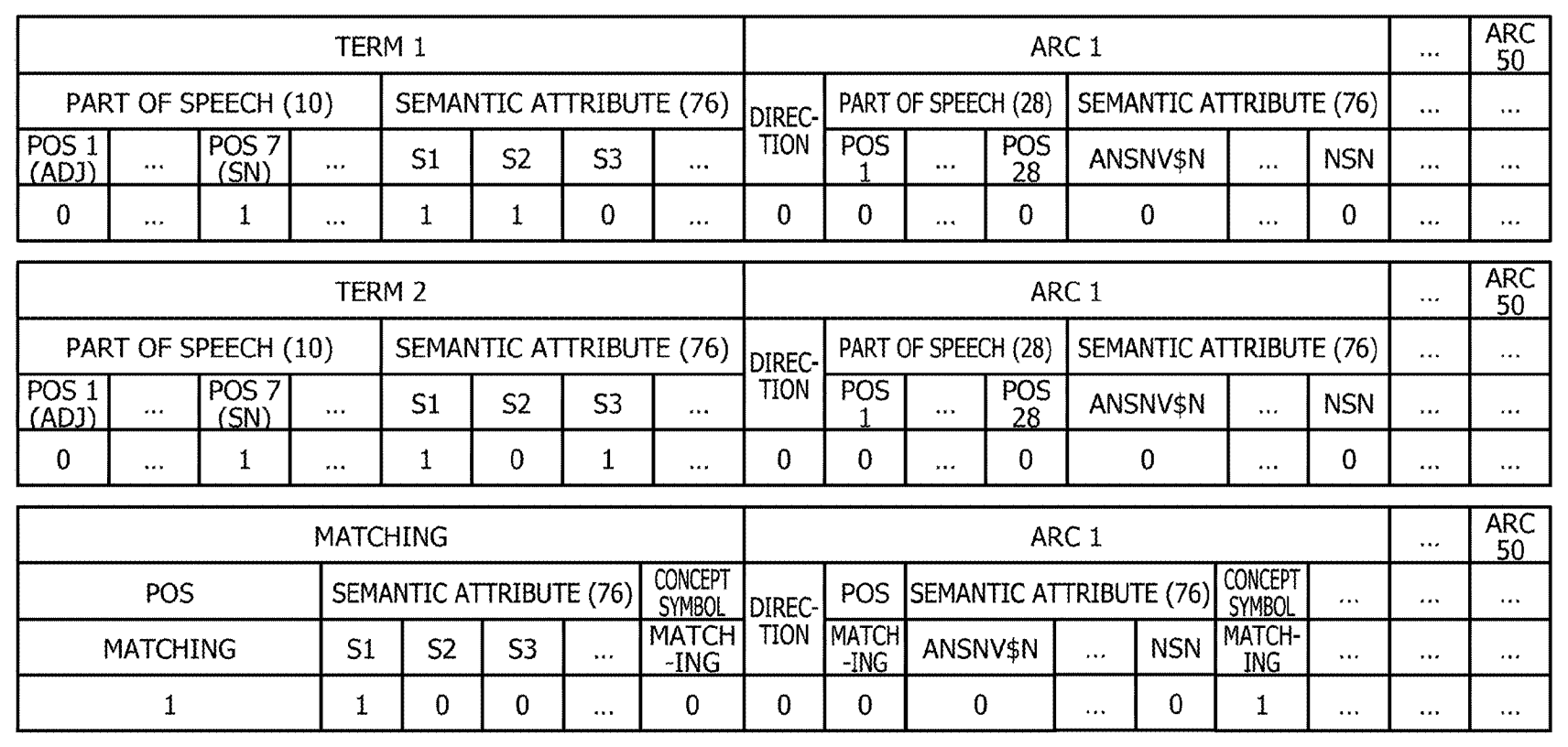

One example of the characteristic vector 23 with such the compressed dimension is described with reference to FIG. 18. FIG. 18 is a diagram illustrating one example of the characteristic vector as a dimension compression result according to the second embodiment. As illustrated in FIG. 18, the characteristic vector 23 for a term 1 includes 10 parts of speech and 76 semantic attributes. Further, for each of 50 arcs, the characteristic vector 23 for the term 1 includes 1 direction, 28 parts of speech, and 76 semantic attributes. Moreover, the characteristic vector 23 for a term 2 includes 10 parts of speech and 76 semantic attributes. Further, for each of 50 arcs, the characteristic vector 23 for the term 2 includes 1 direction, 28 parts of speech, and 76 semantic attributes. Moreover, the characteristic vector 23 as a comparison result between the term 1 and the term 2 includes comparison results related to 1 part of speech, 76 semantic attributes, and 1 concept symbol. Further, for each of 50 arcs, the characteristic vector 23 as the comparison includes comparison results related to 1 direction, 1 part of speech, 76 semantic attributes, and 1 concept symbol.

In other words, the number of dimensions of the characteristic vector 23 as a dimension compression result is expressed by the following computational expression (2).

Number of dimensions=((10 parts of speech+76 semantic attributes)+50 arcs×(28 parts of speech+76 semantic attributes))×2+(1 part of speech+76 semantic attributes+1 concept symbol)+50 arcs×(1 part of speech+76 semantic attributes+1 concept symbol)=14,550 dimensions    Expression (2)

In this manner, the number of dimensions of the characteristic vector 23 as a dimension compression result becomes the number of dimensions more practical than the number of dimensions of the characteristic vector 23 that uses all the characteristic information, and becomes the number of dimensions to allow the SVM to reliably process.

Herein, a determination result by synonym determination processing that uses the characteristic vector 23 as a dimension compression result according to the second embodiment is described with reference to FIG. 19. FIG. 19 is a diagram illustrating one example of a determination result by synonym determination processing according to the second embodiment.

As illustrated in the upper-row in FIG. 19, it is assumed that 2306 examples of the training data 21 are created in the learning phase 10A.

As illustrated in the middle-row in FIG. 19, in order to check the determination accuracy, the training data 21 are divided in advance into three groups. In the learning phase 10A, one group of the training data 21 is used. Herein, it is assumed that a data group x is used. In the operating phase 10B, the remaining one group of the training data 21 is used. Herein, it is assumed that a data group y is used.

As illustrated in the lower-row in FIG. 19, the operating phase 10B performs the synonym determination by inputting data of the data group y, and outputs a determination result. As the determination result, out of 769 examples, the number of examples that a person and a machine (SVM) determine as being synonyms is 175 examples, and the number of examples that the person and the machine determine as not being synonyms is 261 examples. Moreover, the number of examples that the person determines as being synonyms but the machine determines as not being synonyms is 80 examples. This is because the machine overlooks the examples which are to be determined as being synonyms. Moreover, the number of examples that the person determines as not being synonyms but the machine determines as being synonyms is 253 examples. This is because the machine excessively extracts (determines) synonyms which are desired to be determined as not being synonyms. Accordingly, the extraction rate of synonym becomes 175/(175+80)=69%. Although 253 examples are the excessive extraction, the effort for redetermination is smaller than that when a person makes a synonym determination to allow the combinations, so that it is possible to practically use the synonym determination. This may significantly reduce the cost of a person (time to deal), compared with a case where the person reads all the sentences and makes a synonym determination.

In addition, setting the threshold used in the operating phase 10B to more than 1, for example, causes the operating phase 10B to determine a larger number of terms as determination impossible. This may reduce the overlooking cases, and reduce recheck of all the sentences by a person. Meanwhile, the person is requested to recheck the determination result because of the increased excessive extraction, however, the cost of which is smaller than that for the recheck of all the sentences, which is effective.

[Effect of Second Embodiment]

In this manner, the semantic structure 22 includes, as attribute information included in a term and relation information between the term and the other terms, attribute information and relation information respectively based on use frequencies. Accordingly, the information processing apparatus 1 inputs the characteristic vector 23 that uses the semantic structure 22 into the machine learning device, thereby allowing the reliable processing by the machine learning device. In other words, the information processing apparatus 1 reduces the number of dimensions (features) of the characteristic vector 23 to allow the practical processing by the machine learning device.

[Others]

The case where the information processing apparatus 1 according to the first and second embodiments automatically performs a synonym determination using the semantic structure 22 has been described. However, the information processing apparatus 1 is not limited to this case, but may automatically perform polyseme determination using the semantic structure 22. For example, the information processing apparatus 1 creates a pair of information each including a determination target term as being a polyseme as the training data 21 of the positive example and an example question sentence including the term. The information processing apparatus 1 creates a pair of information each including a determination target term as being a polyseme as the training data 21 of the negative example and an example question sentence including the term. Further, the information processing apparatus 1 generates, for every training data 21, the respective semantic structures 22 of two example sentences included in the pair indicated in the training data 21. Further, the information processing apparatus 1 compares the pair of the semantic structures 22 for every training data 21 to generate the characteristic vector 23 for machine learning. Further, the information processing apparatus 1 inputs the characteristic vector 23 for machine learning that is generated for every training data 21 into the SVM to derive the weight vector 24 as a learning result. Further, the information processing apparatus 1 performs a polyseme determination on terms present in the inputted document using the weight vector 24 derived by the operating phase 10. Accordingly, the information processing apparatus 1 inputs the characteristic vector 23 for every term into the SVM to make it possible to improve the determination accuracy related to the polyseme between the terms.

In addition, the information processing apparatus 1 according to the first and second embodiments may generally implement, similar to the determination of synonym and polyseme, processing of determining the property by comparison between two terms, regarding the property of term that changed in accordance with the use method (the usage of term in the sentence). For example, the information processing apparatus 1 creates a pair of information each including a determination target term as being the property of determination purpose as the training data 21 of the positive example and an example question sentence including the term. The information processing apparatus 1 creates a pair of information each including a determination target term as not being the property of determination purpose as the training data 21 of the negative example and an example question sentence including the term. In the subsequent processing, with the processing the same as the processing described above by replacing the "synonym determination" of "determination purpose related to determination", a determination whether a determination purpose property is included between the terms present in the inputted document is made. Accordingly, the information processing apparatus 1 inputs the characteristic vector 23 for every term into the SVM to make it possible to improve the determination accuracy related to the determination purpose between the terms.

Moreover, each component element in the information processing apparatus 1 illustrated is not necessarily physically configured as illustrated in the drawings. In other words, the specific mode of distribution or integration of the information processing apparatus 1 is not limited to the one as illustrated in the drawings, but the whole or a part thereof may be configured by being functionally or physically distributed or integrated in arbitrary units in accordance with various kinds of loads, use statuses, or the like. For example, the semantic analysis unit 11 and the semantic analysis unit 14 may be integrated as one unit. The characteristic vector generation unit 12 and the characteristic vector generation unit 15 may be integrated as one unit. Moreover, the characteristic vector generation units 12 and 15 may be separated into an isolation unit, a first generation unit that generates the characteristic vector 23 of a term, and second generation unit that generates the characteristic vector 23 for machine learning or as a determination target. The isolation unit is a function unit that isolates the specific semantic structure 22 from the semantic structure 22. The first generation unit is a function unit that generates the characteristic vector 23 of a term from the isolated semantic structure 22. The second generation unit is a function unit that generates the characteristic vector 23 for machine learning or as a determination target by connecting the two the characteristic vector 23 of terms and the characteristic vector 23 as a comparison result. Moreover, the storage unit 20 may be connected to the information processing apparatus 1 as an external device via a network.

Figure 20:
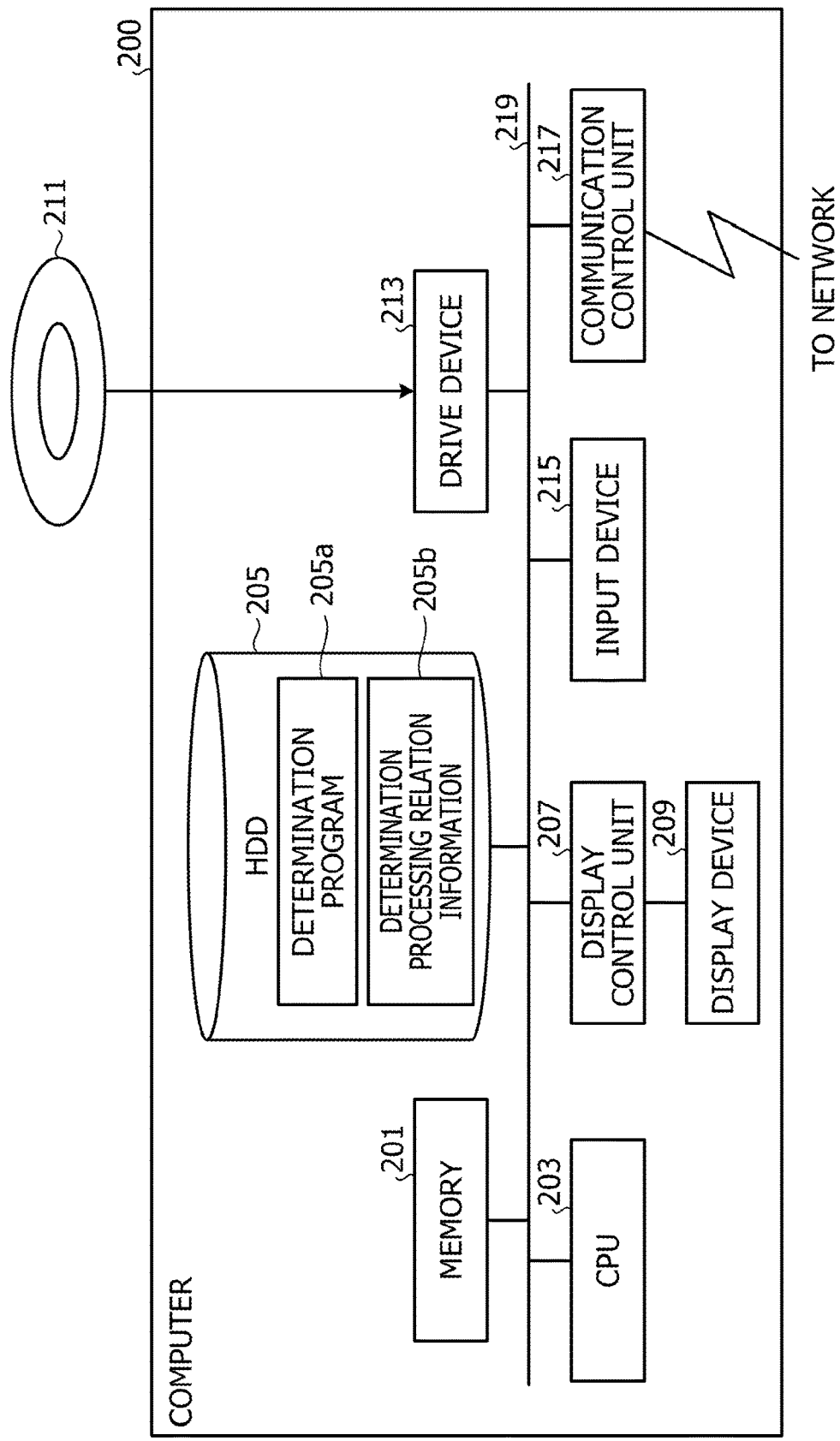
FIG. 20 is a diagram illustrating one example a computer that executes a determination program.

Moreover, the various kinds of processing having been explained in the abovementioned embodiments may be implemented such that a computer such as a personal computer or a work station executes a program prepared in advance prepare. Therefore, one example of a computer that executes a determination program for implementing the function similar to that by illustrated in FIG. 1 is described below. FIG. 20 is a diagram illustrating one example a computer that executes a determination program.

As illustrated in FIG. 20, a computer 200 includes a CPU 203 that executes various kinds of computation processing, an input device 215 that receives an input of data from a user, and a display control unit 207 that controls a display device 209. Moreover, the computer 200 includes a drive device 213 that reads a program or the like from a storage medium, and a communication control unit 217 that transfers data with another computer via the network. Moreover, the computer 200 includes a storage unit 201 that temporarily stores therein various kinds of information, and an HDD 205. Further, the storage unit 201, the CPU 203, the HDD 205, the display control unit 207, the drive device 213, the input device 215, and the communication control unit 217 are coupled through a bus 219.

The drive device 213 is a device for a removable disk 211, for example. The HDD 205 stores therein determination program 205*a* and determination processing relation information 205*b*.

The CPU 203 reads the determination program 205*a* and loads on the storage unit 201, and executes the determination program 205*a* as processes. The processes correspond to the respective function units in the information processing apparatus 1. The determination processing relation information 205*b* corresponds to, for example, the training data 21, the semantic structure 22, the characteristic vector 23, and the weight vector 24. Further, for example, the removable disk 211 stores therein various kinds of information such as the determination program 205*a*.

Noted that the determination program 205*a* does not have to be stored in the HDD 205 from the beginning. For example, the program is stored in a "transportable physical medium" that is inserted into the computer 200, such as flexible disk (FD), a CD-ROM, a DVD disk, an optical magnetic disk, an IC card, or the like. Further, the computer 200 may read the determination program 205*a* from these and execute the determination program 205*a*.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A computer-implemented determination method comprising:
   receiving a plurality of sentences and designation of terms included in the plurality of sentences;
   generating, for each term of a plurality of terms designated by the designation, information indicating relations between each term of plurality of terms and other terms included in each sentence of the plurality of sentences;
   extracting, from the generated information, first specific information indicating a first specific relation in the relations of a first term included in a first sentence and second specific information indicating a second specific relation in the relations of a second term included in a second sentence;
   generating a first characteristic vector based on the first specific information and a second characteristic vector based on the second specific information;
   generating a first specific vector by comparing the first characteristic vector with the second characteristic vector; and
   determining similarity between another plurality of the terms on the basis of the first characteristic vector, the second characteristic vector, and the generated first specific vector.

2. The determination method according to claim 1, wherein the relations is identified by meaning connections between each term of plurality of terms and the other terms.

3. The determination method according to claim 2, wherein
   the first specific relation is extracted by extracting, from the meaning connections of the first term, a meaning connection between the first term and another term which is directly connected to the first term in the meaning connections of the first term.

4. The determination method according to claim 1, comprising:
   generating a second specific vector by synthesizing the first characteristic vector, the second characteristic vector, and the generated first vector,
   wherein the determining of the similarity is executed on the basis of the second specific vector.

5. The determination method according to claim 1, further comprising:
   receiving similarity-dissimilarity information indicating whether each term of the plurality of terms is similar to each other; and
   performing machine learning by using the first characteristic vector, the second characteristic vector, the generated first specific vector, and the similarity-dissimilarity information,
   wherein the determining of the similarity includes determining the similarity between the other plurality of the terms on the basis of a result of a result of the machine learning.

6. The determination method according to claim 4, wherein
   the determining of the similarity includes determining the similarity between the other plurality of the terms on the basis of a result of machine learning executed by using the second specific vector.

7. A determination apparatus comprising:
   a memory; and
   a processor coupled to the memory and configured to:
     receive a plurality of sentences and designation of terms included in the plurality of sentences,
     generate, for each term of a plurality of terms designated by the designation, information indicating a relations between each term of plurality of terms and other terms included in each sentence of the plurality of sentences,
     extract, from the generated information, first specific information indicating a first specific relation in the relations of a first term included in a first sentence and second specific information indicating a second specific relation in the relations of a second term included in a second sentence,
     generate a first characteristic vector based on the first specific information and a second characteristic vector based on the second specific information,
     generating a first specific vector by comparing the first characteristic vector with the second characteristic vector, and
     determine similarity between another plurality of the terms on the basis of the first characteristic vector, the second characteristic vector, and the generated first specific vector.

8. The determination apparatus according to claim 7, wherein
the relations is identified by meaning connections between each term of plurality of terms and the other terms.

9. The determination apparatus according to claim 8, wherein
the first specific relation is extracted by extracting, from the meaning connections of the first term, a meaning connection between the first term and another term which is directly connected to the first term in the meaning connections of the first term.

10. The determination apparatus according to claim 7, comprising:
generating a second specific vector by synthesizing the first characteristic vector, the second characteristic vector, and the generated first vector,
wherein the determining of the similarity is executed on the basis of the second specific vector.

11. The determination apparatus according to claim 7, further comprising:
receiving similarity-dissimilarity information indicating whether each term of the plurality of terms is similar to each other; and
performing machine learning by using the first characteristic vector, the second characteristic vector, the generated first specific vector, and the similarity-dissimilarity information,
wherein the determining of the similarity includes determining the similarity between the other plurality of the terms on the basis of a result of a result of the machine learning.

12. The determination apparatus according to claim 10, wherein
the determining of the similarity includes determining the similarity between the other plurality of the terms on the basis of a result of machine learning executed by using the second specific vector.

13. A non-transitory computer-readable medium storing a determination program executable by one or more computers, the determination program comprising instructions for:
receiving a plurality of sentences and designation of terms included in the plurality of sentences;
generating, for each term of a plurality of terms designated by the designation, information indicating relations between each term of plurality of terms and other terms included in each sentence of the plurality of sentences;
extracting, from the generated information, first specific information indicating a first specific relation in the relations of the first term included in a first sentence and second specific information indicating a second specific relation in the relations of a second term included in a second sentence;
generating a first characteristic vector based on the first specific information and a second characteristic vector based on the second specific information;
generating a first specific vector by comparing the first characteristic vector with the second characteristic vector; and
determining similarity between another plurality of the terms on the basis of the first characteristic vector, the second characteristic vector, and the generated first vector.

* * * * *